US010281281B2

(12) United States Patent
Ward

(10) Patent No.: US 10,281,281 B2
(45) Date of Patent: May 7, 2019

(54) DECISION SUPPORT AND CONTROL SYSTEMS INCLUDING VARIOUS GRAPHICAL USER INTERFACES CONFIGURED FOR DISPLAYING MULTIPLE TRANSIT OPTIONS FOR A PLATFORM WITH RESPECT TO HAZARD AND OBJECTS AND RELATED METHODS

(71) Applicant: The United States of America as represented by the Secretary of the Navy, Washington, DC (US)

(72) Inventor: Matthew K. Ward, Ventura, CA (US)

(73) Assignee: THE UNITED STATES OF AMERICA AS REPRESENTED BY THE SECRETARY OF THE NAVY, Washington, DC (US)

( * ) Notice: Subject to any disclaimer, the term of this patent is extended or adjusted under 35 U.S.C. 154(b) by 369 days.

(21) Appl. No.: 15/250,604

(22) Filed: Aug. 29, 2016

(65) Prior Publication Data

US 2017/0059333 A1 Mar. 2, 2017

Related U.S. Application Data

(60) Provisional application No. 62/213,528, filed on Sep. 2, 2015.

(51) Int. Cl.
*G06F 3/14* (2006.01)
*G01C 21/20* (2006.01)
*G06F 3/147* (2006.01)

(52) U.S. Cl.
CPC ............. *G01C 21/203* (2013.01); *G06F 3/14* (2013.01); *G06F 3/147* (2013.01); *G09G 2354/00* (2013.01); *G09G 2380/10* (2013.01)

(58) Field of Classification Search
CPC ......... G01C 21/203; G06F 3/147; G06F 3/14; G09G 2380/10; G09G 2354/00
See application file for complete search history.

(56) References Cited

U.S. PATENT DOCUMENTS 8,244,469 B2 * 8/2012 Cheung ................... G01S 7/003
700/248
8,577,538 B2 11/2013 Lenser et al.
(Continued)

FOREIGN PATENT DOCUMENTS

| CN | 102129249 A | 7/2011 |
| EP | 2881707 A1 | 6/2015 |
| WO | WO2014/060698 A1 | 4/2014 |

OTHER PUBLICATIONS

Rowe et al., "Military Aviation Applications for a Springs and Masses Safest Path determining Model"; Journal of Battlefield Technology vol. 12, No. 1, Mar. 2009; available at http://www.argospress.com/jbt/article_abstracts/12-1-5-abstract.pdf; 1 page.
(Continued)

*Primary Examiner* — Thomas Ingram
(74) *Attorney, Agent, or Firm* — Christopher A. Monsey

(57) ABSTRACT

A decision support and control system including a Graphical User Interface configured for displaying multiple transit options for a platform with respect to hazard and objects along with accompanying methods is provided. The methods and apparatus may receive information from a variety of systems such as a ship's radar and electro-optical systems to derive threat information, and a ship's weapon systems that may include both lethal and non-lethal weapons, the maximum and minimum range of the weapons, the accuracy characteristics of the weapons, and the maximum and minimum azimuth angles that the weapons can engage. The apparatus and methods may provide multiple transit options for a ship that provides tactical suggestions for a ship to
(Continued)

successfully defend itself against a swarm attack by multiple incoming threats. Such tactical suggestions illustratively account for the various paths being presented and may also present performance metrics such as associated probabilities of success.

36 Claims, 25 Drawing Sheets

(56) References Cited

U.S. PATENT DOCUMENTS

| | | | |
|---|---|---|---|
| 8,583,361 B2 | 11/2013 | Lewis et al. | |
| 2010/0057662 A1* | 3/2010 | Collier | G06Q 10/04 706/52 |
| 2015/0073663 A1 | 3/2015 | Nilsson | |
| 2015/0278734 A1 | 10/2015 | Grant et al. | |
| 2016/0047663 A1 | 2/2016 | Iyer et al. | |
| 2016/0125739 A1* | 5/2016 | Stewart | G08G 3/02 701/21 |
| 2016/0299507 A1* | 10/2016 | Shah | G05D 1/0206 |

OTHER PUBLICATIONS

Eames, "Enabling Path Flaming and Threat Avoidance with Wireless Sensor Networks"; published 2005; available at http://citeseerx.ist.psu.edu/viewdoc/download?doi=10.1.1.87.1586&rep=rep1&type=pdf; 68 pages.

Ragi et al., "UAV Path Planning in a Dynamic Environment via Partially Observalbe Markov Decision Process"; IEEE Transactions on Aerospace and Electronic Systems, Oct. 2013; available at https://www.researchgate.net/profile/Shankarachary_Ragi/publication/257922149_UAV_Path_Planning_in_a_Dynamic_Environmentvia_Partially_Observable_Markov_Decision_Process/links/00b7d526694877288a000000.pdf; 17 pages.

Day, "Multi-Agent Negotiation Among UAVs to Defend Against Swarm"; published 2012; available at http://calhoun.nps.edu/bitstream/handle/10945/6784/12Mar_Day.pdf?sequence=3&isAllowed=y; 82 pages.

Kamrani, "Using On-line Simulation in UAV Path Planning"; published 2007; available at http://www.diva-portal.org/smash/gct/diva2:12687/FULLTEXT01/pdf; 110 pages.

* cited by examiner

193 — PATH GENERATION

% Inputs: Areas of Restriction, Movement capabilities of ship: Maximum Right and Maximum Left turns, current heading theta
% Outputs: shipPath, velocityVectors % Step 1: Movement Capabilities used to determine the maximum turning
% capabilities for the ship
maxRight = determineMaxRight(shipLength, etc); %may want to treat these as inputs for simplicity  } 231
maxLeft = determineMaxLeft(shipLength, etc);

maxIterations = 100;
dt = 10; %seconds, will depend on capabilities                                                     } 233
theta = heading; %input while completePath == 0
    k = 1;
    velocityVectors = [];
    shipPath = [];
    while k < maxIterations && shipLocationValid == 1      } 235
        k = k+1;
        %Randomly choose which way to turn
        newDirection = randSelect(straight, maxRight, maxLeft);

% Rotate this vector according to the current heading theta
        newDirectionRotated = [cos(theta) -sin(theta); sin(theta) cos(theta)]*newDirection;      } 237

%append the new direction to the list of velocity vectors
        velocityVectors = [velocityVectors; newDirectionRotated];

%update the location of the ship
        shipLocation = shipLocation + newDirectionRotated;

FIG. 12A

```
if shipLocation outside exclusion
    shipLocationValid = 1;
    %update heading
    theta = atan2(newDirectionRotated(2)/newDirectionRotated(1));
    %append the new location of the ship to the path
    shipPath = [shipPath; shipLocation];
else
    shipLocationValid = 0;
end
end %end path generation loop if k == maxIterations && shipLocationValide == 1
    completePath = 1;
end
end
```

194 — PATH GENERATION WITH OPTIMIZATION

```
% fig12
% Path Generation with Optimization
% Inputs: Number Candidate Solutions Per Generation = numCandidateSolutionsPerGeneration
%         Number of Iterations = numIterations
% Outputs: Candidate Paths and their performance characteristics = c %Initialize Candidate Solutions
for i = 1:numCandidateSolutionsPerGeneration
    pathCreationInputs = input_creation(stuff); %edit      ⎫
    c(i).path = path_creation_function(pathCreationInputs);⎬ 261
end                                                        ⎭

% Evaluate the performaces of each candidate path
for i = 1:numCandidateSolutionsPerGeneration                                      ⎫ 263
    c(i).performance = path_performance_evaluation(c(i), MC_Parameters, SUW_Inputs);⎬
end                                                                                ⎭

% Sort the paths based off their probability of success  ⎫ 265
c = sort(c,performance.ProbSuccess);                     ⎭ for k = 2:numIterations  ⎫ 267
                         ⎭
    for j = 1:numCandidateSolutionsPerGeneration                                              ⎫
        % create new candidate solutions using the available information from                 ⎪
        % the paths already calculated                                                        ⎪
        % An optimization algorithm can be used right here, such as a                         ⎪
        % genetic algorithm, particle swarm optimization, Nelder-Mead, etc.                   ⎪
        c(end+j).path = path_creation_function(pathCreationInputs, c(1:end).path);            ⎬ 269

% Evaluate new candidate's performance                                                ⎪
        c(end+j).performance = path_performance_evaluation(c(end+j), MC_Parameters, SUW_Inputs);⎪
    end                                                                                        ⎭ c = sort(c,performance.ProbSuccess);  ⎫ 271
end                                       ⎭
```

FIG. 13

195 — PATH PERFORMANCE METRIC CALCULATION

```
performance = function path_performance_evaluation(c, MCParameters, SUW Inputs)

iterations = MCParameters.iterations;
for i = 1:MCIterations
    % SUW Outputs is a matrix. Each row represents an individual output type.
    % The entry in each row is 1 for a defeating the swarm, 0 for losing
    % against the swarm
    % Second entry is the time of engagement
    % Third entry is the number of enemies destroyed.
    % More outputs can be included depending on the user's desire
    suwOutputs(i,:) = SUWModel(SUW inputs, c.path);
end performance.ProbSuccess = sum(suwOutputs(:,1))/MCIterations;      ⎫ 291
performance.expectedTime = sum(suwOutputs(:,2))/MCIterations;     ⎬
performance.expectedEnemiesDestroyed = sum(suwOutputs(:,3))/MCIterations; ⎭
performance.Raw = suwOutputs;                                     ⎫ 293
performance.secondary = evaluate_secondary_effects(c);            ⎭
```

FIG. 14

197 — SURFACE WARFARE MODEL

```
%SUW Model
function suwOutputs = SurfaceWarfareModel(SUW_Inputs, path)  } 311
t = 0;
threatsPresent = 1;
while shipAlive == 1 && threatsPresent == 1
    t = t+1;
    % Update ship position
    shipLocation = shipPath(t,:);                                    } 313
    % Update swarm positions
    SUW_Inputs.swarmLocations = Simulate_Threat_Behavior(SUW_Inputs.swarmLocations, shipLocation);  } 315
    % simulate weapon engagements
    for k = 1:numShipWeapons
        % check if anyone is destroyed
        SUW_Inputs.swarmLocations = simulateEngagement(shipLocation, SUW_Inputs.swarmLocations, weaponStDev(k));  } 317
    end
    % Update whether any threats are present
    If size (SUW_Inputs.swarmLocations) == 0                          } 318
        threatsPresent = 0;
    end
    % Update whether ship is alive by checking to see how close the
    % nearest attacker is
    if min(norm2(swarmLocations-shipLocations)) < rpg_range           } 319
        shipAlive = 0;
        break
    end
end
suwOutputs{1} = shipAlive;
suwOutputs{2} = t;                                                     } 321
suwOutputs{3} = numberOriginalAttackers - length(SUW_Inputs.swarmLocations);
```

FIG. 15

199 — | SIMULATE THREAT BEHAVIOR |

```
function SUW_Inputs.swarmLocations = Simulate_Threat_Behavior(SUW_Inputs.swarmLocations, shipLocation)
%BoatLocationMatrix is an Nx2 matrix representing (x,y) pairs for the N
%boats
%NavyShipLocation is a 1x2 vector representing the (x,y) location of the
%Ship
% Returns BoatVectors, which is an Nx2 matrix representing the (x,y)
% velocity vectors of the N input boats, normalized to a magnitude of 1.
BoatLocationMatrix = SUW_Inputs.swarmLocations;
[N dummy] = size(BoatLocationMatrix);

%Finds the vector difference to point the way the attacking boats must
%travel to attack the ship. Very simple, they just go straight for the
%ship.
NavyShipMatrix(1:N,1) = shipLocation(1);                    ⎫
NavyShipMatrix(1:N,2) = shipLocation(2);                    ⎬ 341
BoatVectorsInitial = NavyShipMatrix-BoatLocationMatrix;     ⎭

% Normalize to unit vector for easy multiplication on the outside. This
% gives direction, then just need to multiply by the distance
VectorMagnitude = sqrt(BoatVectorsInitial(:,1).^2 + BoatVectorsInitial(:,2).^2);   ⎫
BoatVectors{:,1} = BoatVectorsInitial(:,1)./VectorMagnitude;                       ⎬ 343
BoatVectors{:,2} = BoatVectorsInitial(:,2)./VectorMagnitude;                       ⎭

% Update locations                                                                  ⎫ 345
SUW_Inputs.swarmLocations = SUW_Inputs.swarmLocations + BoatVectors*SUW_Inputs.boatSpeed;  ⎭
```

FIG. 16

203 — SIMULATE ENGAGEMENTS

```
function SUW_Inputs.swarmLocation = getEngagement(shipLocation,SUW_Inputs.swarmLocation,weaponChar(k,:))
% NavyShipLocation is the (x,y) coordinates of the Navy ship.
% BoatLocationMatrix is the Nx2 matrix with the (x,y) coordinates of the
% boats
% BoatVectors is the Nx2 matrix with the speed vectors for all the boats
% Returns updated swarm locations for the boats that survived.

%calculate a delta matrix
[N dummy] = size(SUW_Inputs.swarmLocation);
NavyShipMatrix{1:N,1} = shipLocation{1};
NavyShipMatrix{1:N,2} = shipLocation{2};
DeltaMatrix = SUW_Inputs.swarmLocation - NavyShipMatrix;
DistanceVector = sqrt(DeltaMatrix(:,1).^2 + DeltaMatrix(:,2).^2);         }— 361

% find closest boat for the ship to target
minDist = min(DistanceVector);
DistLog = DistanceVector==minDist;
index = find(DistLog,1);                                                   }— 363

% index corresponds to the closest ship, take its (x,y)
CurrentTargetCoord = DeltaMatrix(index,:);

%rotate the simulated engagement coordinate by the weapon input
weaponStDev = weaponChar(k,1);
weaponBlastRadius = weaponChar(k,2);
angle = randn(1)*weaponStDev(k); %sample from a Normal Random distribution
rotMatrix = [cos(angle) -sin(angle); sin(angle) cos(angle)];
hitCoordinates = rotMatrix*CurrentTargetCoord(:);                          }— 365
```

FIG. 17A

```
% calculate the difference between the hit location and the boats, then
% find whatever boats are outisde the blast radius
hitDifference = [SUW_Inputs.swarmLocation(:,1)-hitCoordinates(1) SUW_Inputs.swarmLocation(:,2)-hitCoordinates(2)];
hitDistance = sqrt(hitDifference(:,1).^2 + hitDifference(:,2).^2);
hitLogicalOpposite = hitDistance > weaponBlastRadius;
```
⎫
⎬ 367
⎭

```
%keep only the swarm members that are outside the blast radius
updatedIdx = find(hitLogicalOpposite);
SUW_Inputs.swarmLocation = SUW_Inputs.swarmLocation(updatedIdx,:);
```
⎫
⎬ 369
⎭

FIG. 17B

205 — PLOT

```
function plotFigure = plotFunction(shipPath, SUW_Inputs.swarmLocations,performance.ProbSuccess)
UI.activate                                                                                      } 381
hold on plot(triangle, [shipPath(1,1) shipPath(1,2)]); %plot the current location of the ship path as a triangle  } 383
plot(shipPath(:,1),shipPath(:,2),'b--') %plot the ship path as a dashed line swarmx = SUW_Inputs.swarmLocations{:,1};
swarmy = SUW_Inputs.swarmLocations{:,2};                                                          } 385
plot(swarmx, swarmy,'ro') %plot the enemy locations labelx = shipPath(end,1);
labely = shipPath(end,2);                                                                         } 387
placeTextBox(performance.ProbSuccess,[labelx labely]) %place a text box with the probability of success
```

FIG. 18

GLOBAL VARIABLES

| VARIABLE NAME | DESCRIPTION |
|---|---|
| shippath | A LIST OF (X,Y) COORDINATES THAT INCREMENTS BY DELTA T |
| velocityvectors | LIST OF VELOCITY VECTORS FOR THE SHIP. INTEGRATING THESE ACROSS TIME WITH THE STARTING LOCATION OF THE SHIP WILL PRODUCE THE SHIPPATH |
| performance.[] | DATA STRUCTURE THAT CONTAINS THE PERFORMANCE METRICS FOR A PATH THAT ARE CALCULATED USING MONTE CARLO SIMULATION |
| performance.ProbSuccess | PROBABILITY OF SUCCESS FOR A PATH |
| performance.expectedTime | EXPECTED TIME OF THE ENGAGEMENT |
| performance.expectedEnemiesDestroyed | EXPECTED NUMBER OF ENEMIES DESTROYED |
| performance.Raw | RAW OUTPUTS OF THE SIMULATION THAT MAY BE USED FOR FURTHER ANALYSIS |
| SUW_Inputs.[] | DATA STRUCTURE THAT CONTAINS VARIOUS INFORMATION FOR THE SURFACE WARFARE MODEL |
| SUW_Inputs.swarmLocations | A MATRIX CONTAINING THE (X,Y) COORDINATES FOR EACH OF THE THREATS |
| shipLocation | THE (X,Y) LOCATIONS FOR THE SHIP AT THE TIME WITHIN THE MODEL. COMES FROM THE SHIPPATH MATRIX. |
| c | DATA STRUCTURE THAT CONTAINS EACH CANDIDATE PATH AND THEIR RESPECTIVE PERFORMANCE METRICS |

Calculating performance metrics through use of a Monte Carlo simulation section in the FSOCS, e.g., Surface Warfare Model, based on inputs comprising the first capabilities data, second capabilities data, the external data, and the HOTD based on, e.g., a process showing calculation
  a. The Monte Carlo simulation executes the FSOCS, e.g., the Surface Warfare Model, repeatedly to calculate expected values
  b. Simulating a platform movement scenario using the FSOCS, e.g., Surface Warfare Model, which simulates a movement of said platform scenario that comprises operating exemplary sub-modules comprising:
     i. Simulate hazard or object module, e.g., Threat, Behavior that calculates an approach vector for each hazard, object, or threat with respect to the platform.
     ii. Simulate Engagements module that simulates engagements for each of the equipment, e.g., the weapons, onboard the platform using equipment weapon with respect to equipment, e.g., weapon's, capacity to interact with the hazards or objects, e.g., to, e.g., a standard deviation. After an engagement data from the equipment, e.g., weapon's hit coordinate, are determined, any hazards, objects, or threat that are within the equipment's interaction zone, e.g., effect of the weapon's blast radius, has been eliminated, altered, or destroyed then removed as a hazard.
     iii. Updating the Platform's location module using an updated input CP and a current time of the simulation.
     iv. Scenario Result Designation module configured to designated one or more said CPs or the platform movement scenario simulation run as ineffective (all CPs falling below a predetermined percentage of success) based on, e.g., a loss or unacceptable damage to the platform, if any hazard or object, e.g., one or more said threats from an enemy, is within the Minimum Safe Distance (e.g., rocket propelled range (e.g., rpg_range variable))
     v. Secondary effects determination module configured for designating or determining one or more secondary effects associated with said hazards or objects which have a secondary effect designator and an impact level comprising a degree of harm identifier associated with harm to the hazards or objects if they are damaged or harmed.

FIG. 20B

DECISION SUPPORT AND CONTROL SYSTEMS INCLUDING VARIOUS GRAPHICAL USER INTERFACES CONFIGURED FOR DISPLAYING MULTIPLE TRANSIT OPTIONS FOR A PLATFORM WITH RESPECT TO HAZARD AND OBJECTS AND RELATED METHODS

CROSS-REFERENCE TO RELATED APPLICATION

This application claims priority to U.S. Provisional Application Ser. No. 62/213,528, filed on Sep. 2, 2015, the disclosure of which is expressly incorporated herein by reference.

STATEMENT REGARDING FEDERALLY SPONSORED RESEARCH OR DEVELOPMENT

The invention described herein was made in the performance of official duties by an employee of the Department of the Navy and may be manufactured, used and licensed by or for the United States Government for any governmental purpose without payment of any royalties thereon. This invention (NC 200,279) is assigned to the United States Government and is available for licensing for commercial purposes. Licensing and technical inquiries may be directed to the Office of Research and Technology Applications, Naval Surface Warfare Center Port Hueneme; telephone number: (805) 228-7608.

FIELD OF THE DISCLOSURE

The present invention relates to decision support and control system including a graphical user interface configured for displaying multiple transit options for a platform with respect to hazard and objects.

BACKGROUND

A variety of needs exist to address movement of platforms in an environment which include objects and hazards. For example, self driving vehicles, unmanned aerial vehicles, submarines, land based missile platforms, aircraft, etc., all need to interact with an environment which is filled with objects and hazards. Another example can include a small boat swarm attack which is a threat to various ships, including US Navy ships. Tactics for the ship to successfully interact with various environments and entities with such environments, including hazards and objects, can change due to equipment used to mitigate, avoid or address such entities using, e.g., a ship's weapon capabilities, a number and configuration of attackers, areas of restriction the ship can't traverse, etc. Moreover, these environments produce a cognitive load on an operator to determine a best course of action to take.

SUMMARY OF THE INVENTION

The present invention relates to a Graphical User Interface (GUI) that displays multiple transit options for a ship that provides tactical suggestions for a platform (e.g., a ship) to successfully navigate around one or more hazards. In one example, this can include a ship in defense of itself against a swarm attack by multiple incoming threats. Such tactical suggestions illustratively account for paths being presented and their associated probabilities of success. This function is performed over multiple steps. For example first, the ship's radar and electro-optical systems provide the location of the enemy attackers. Second, data on the current capabilities of the ship's weapon systems is also gathered; this can include both lethal and non-lethal weapons, the maximum and minimum range of the weapons, the accuracy characteristics of the weapons, and the maximum and minimum azimuth angles the weapons can engage. Current capability data can also include data related to other capabilities of a platform, such as data related to defense mechanisms of the platform. The threat locations, weapon capabilities, ship speed, maximum allowable distance (stand-off distance) for the attackers to ship, and predicted speed of the attacking craft are treated as global variables for subsequent computer programs.

Various embodiments, such as, for example, a system in accordance with various aspects of the invention can be used to create candidate (e.g., suggested) paths for the ship to traverse. Such candidate paths and associated data described herein can be passed to a surface warfare model to calculate different performance characteristics for the path through the use of Monte Carlo simulations. The surface warfare model possesses various assumptions for how the threats will travel towards the ship and simulates the movement of the threats, as well as the ship, over time. Engagements by the various weapons onboard can also be simulated. Eventually, the surface warfare model will reach a stop condition; example stop conditions include destroying all enemy craft or an attacker breaking the maximum stand-off distance allowed. Once the simulation is complete, metrics are saved. One exemplary output is a determination of whether the ship survived the encounter, but other metrics can include number of threats (e.g., enemies) destroyed (in the case the ship did not survive), time of engagement, and number of successful engagements for each weapon.

In this example, since each of the weapon engagements in the surface warfare model includes a random component, a Monte Carlo simulation, or repeated simulation of a model, can be used to calculate an estimate to a Probability of Success for each candidate path. For example, the candidate path and the external data can be passed to the surface warfare model such as, e.g., described herein, and simulated multiple times. Performance metrics for each model run is stored and then aggregated upon completion of the Monte Carlo simulations to calculate an aggregate Probability of Success and other metrics (for example, expected number of enemies destroyed, expected engagement time, etc.). A desired accuracy for the metrics may influence the number of simulations performed.

Once the candidate path's Probability of Success is calculated, it can be plotted on the user/ship's display system, providing the user/ship a clear indication of the performance for the candidate path. As more candidate paths go through exemplary processes such as described herein, the user/ship's operators (or its automated control systems) can be presented with multiple candidate path options and allow selection of a best performing candidate path or course of action.

Generation of the candidate paths can be performed using an optimization section to utilize the computational resources as efficiently as possible. External data from sensors such as the ship's radar and electro-optical sensors that provide the location of the enemies is sent to various exemplary embodiments for use in generating candidate paths.

In one example, the contemplated methods and apparatus present multiple transverse path options to a platform's (e.g., ship's) operator to defend the platform from an incoming attack by multiple threats. The apparatus may include, for example, one or more processors executing suitable instructions stored on a computer readable medium to perform one or more functions described herein. The computer readable medium can be any suitable memory device, such as a read only memory (ROM), random access memory (RAM), or hard disk. Additionally or alternatively, the apparatus can include other logic such as digital circuitry, analog circuitry, a state machine, or any other suitable logic.

In one example, the apparatus may receive automatic sensor data comprising radar sensor system data, integrated weapon systems data, and external geographic data. The automatic sensor data may be received from one or more automatic sensor data systems including, for example, a radar sensor system, an integrated weapon system, or an external geographic data system, such as a global positioning satellite (GPS) system. In one example, the received radar sensor system data includes at least one threat location. The apparatus may also receive pushed data comprising non-integrated sensor system data from a non-integrated sensor system, such as weapon systems data such as from an external weapon system. The non-integrated sensory system may be any suitable system that, although not capable of providing data, such as sensor data, automatically, is still capable of pushing data to the apparatus.

The apparatus may generate at least one hazard track (e.g., threat track) corresponding to at least one hazard's navigational route based on the radar sensor system data. The apparatus may also generate weapons capabilities data based on the received integrated weapon systems data and non-integrated weapon systems data. The apparatus may generate area of restriction data that identifies at least one area of restriction based on the received external geographic data. The apparatus may then generate a candidate path based on the generated area of restriction data and platform movement capability data (e.g., ship movement capability data). The apparatus may also generate a path performance metric associated with the candidate path based on the at least one hazard track and the weapons capabilities data. The apparatus may then provide for display the candidate path and the path performance metric.

In one embodiment, the generation of the path performance metric includes the execution of a Monte Carlo simulation dependent on at least one hazard track and the weapons capabilities data. In one example, the apparatus may generate the path performance metric associated with a candidate path based on at least one hazard track, the weapons capabilities data, and the candidate path. In one example, the generation of the path performance metric includes the execution of a Monte Carlo simulation dependent on at least one hazard track, the weapons capabilities data, and the candidate path. In another example, the generation of the path performance metric includes the execution of a Monte Carlo simulation dependent on at least one hazard track and the candidate path.

In one embodiment the apparatus generates the candidate path based on a generated area of restriction data, the platform movement capability data, and at least one hazard track. In one example, the apparatus generates the candidate path based on at least one previously generated candidate path. For example, the apparatus may generate the candidate path based on generated area of restriction data, platform movement capability data, at least one hazard track, and at least one previously generated candidate path.

In one embodiment the generation of the path performance metric associated with the candidate path includes generating at least one of an expected number of enemies destroyed and an expected engagement time with at least one hazard where each is associated with the candidate path. The apparatus may then provide for display the expected number of enemies destroyed and the expected engagement time with the at least one hazard. They may be provided for display, for example, along, or at the end of, the displayed candidate path.

In one embodiment the apparatus receives secondary effects data. The apparatus may then generate the path performance metric associated with the candidate path based on at least one hazard track, the weapons capabilities data, and the received secondary effects data.

In one embodiment, the generation of the path performance metric associated with the candidate path includes generating a probability of success associated with the candidate path. The apparatus may then provide for display the probability of success associated with the candidate path.

In one embodiment the apparatus generates a second candidate path based on the generated area of restriction data and platform movement capability data. The apparatus may also generate a second path performance metric associated with the second candidate path based on at least one hazard track and the weapons capabilities data. The apparatus may then provide for display the second candidate path and the second path performance metric.

In one embodiment the apparatus generates a second hazard track corresponding to a second hazard's navigational route based on the radar sensor system data. The apparatus may then generate the path performance metric associated with the candidate path based on the at least one hazard track, the weapons capabilities data, and the second hazard track.

In one embodiment, the apparatus receives, from one or more automatic sensor data systems, automatic sensor data including radar sensor system data and external geographic data. The apparatus may be operable to generate at least one hazard track corresponding to at least one hazard's navigational route based on the radar sensor system data. The apparatus may also be operable to generate area of restriction data that identifies at least one area of restriction based on the received external geographic data. The apparatus may be operable to then generate a candidate path based on the generated area of restriction data and platform movement capability data. The apparatus may also generate a path performance metric associated with the candidate path based on the hazard track, and provide for display the candidate path and the path performance metric. Corresponding methods are also contemplated.

Ability for a system to perform its mission depends on external factors and the system's capabilities. Oftentimes there are a large number of candidate paths the system can transverse, but the quality of these paths will have different performance characteristics. The small boat swarm attack is a realistic and dangerous hazard to the Navy's surface fleet. A variety of expert systems can be used with embodiments of the invention to include a decision engine and a rule base that can be used to simulate or automate engagement of a hazard. This system can also be configured to take into account the ship's current offensive capability as well as rules to provide good solutions when facing many hazards (e.g., 10+). By utilizing a surface warfare model and optimization algorithms, optimal tactics can be formulated that take into account the number of attackers, the configuration of the attackers, and the capabilities of the ship. Moreover, the system reduces the cognitive load of an operator of the ship as it provides candidate paths and metric information, such as probabilities of success in navigating a candidate path.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIGS. 12A and 12B illustrate an exemplary path generation module;

FIG. 13 shows an exemplary path generation module that incorporates an optimization algorithm;

FIG. 14 shows an exemplary path performance metric calculation module;

FIG. 15 shows an exemplary surface warfare model module;

FIG. 16 shows an exemplary module for simulating the threat behavior;

FIGS. 17A and 17B show an exemplary module for simulating the weapon engagements of the ship;

FIG. 18 shows an exemplary plot module;

FIG. 19 shows exemplary data structure variables used in accordance with one embodiment of the invention;

FIG. 20B shows a continuation of the FIG. 20A method;

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
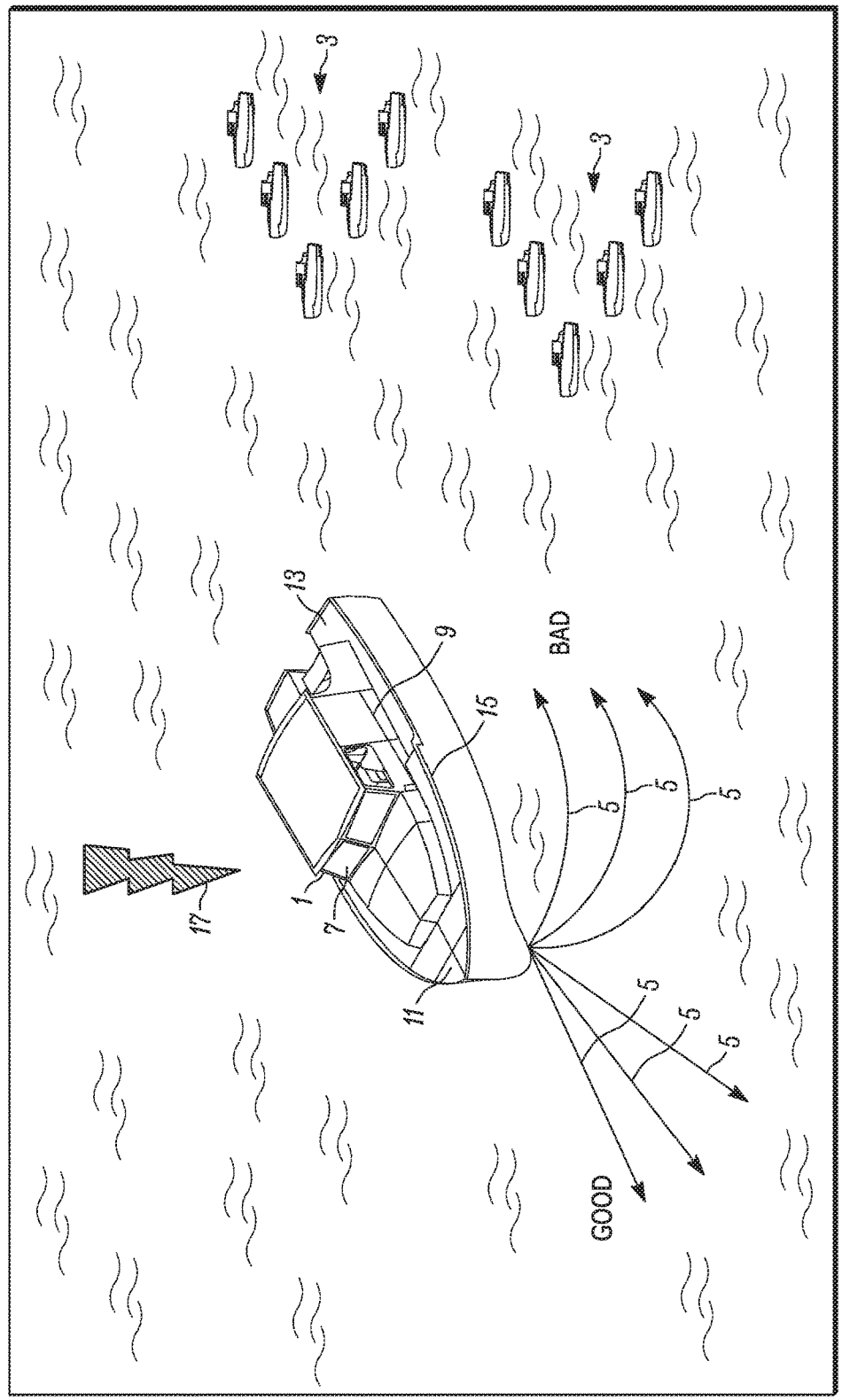
FIG. 1 shows an illustrative ship platform and incoming attackers.

Referring initially to FIG. 1 a platform, illustratively a ship platform 1, which may be operated by a ship operator such as, for example, a human or an autonomous control system, senses incoming attackers 3 using its search radar 7 and sailor operated electro-optical system 9. The ship has multiple potential paths it can take, labeled generically as element 5. Each of these paths will have different performance metrics (for example, probability of success, expected number of enemies destroyed, etc.) that will depend on the weapon capabilities integrated within a combat system, such as the main gun 11, non-lethal weapon systems 13, and man-operated weapons 15. Ship platform also receives external geographic data 17 that includes sources such as satellites, manned and unmanned vehicles, and Global Positioning Information. Also impacting the performance characteristics of 5 are the ship's movement ability (acceleration, turning, and max speed) as well as the attacker configuration and weapon capabilities. Although a ship platform is shown in the figure, it is to be appreciated that the platform may be any suitable platform, such as a vehicle platform (e.g., self driving vehicle), unmanned aerial vehicle, submarine, land based missile platform, or an aircraft.

Figure 2:
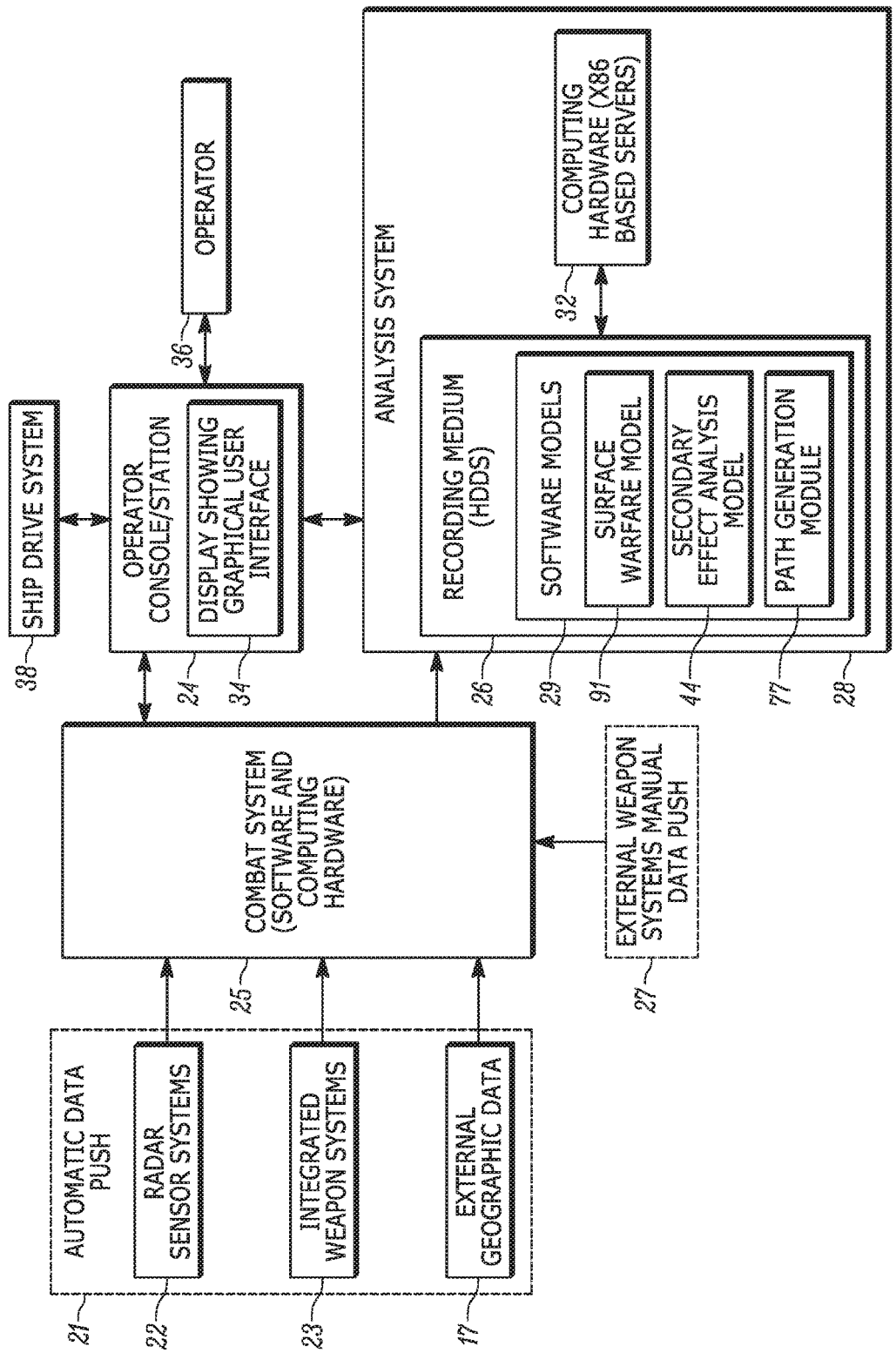
FIG. 2 shows an illustrative high level data flow and hardware architecture diagram of a decision support and control system.

FIG. 2 shows a high level data flow and hardware architecture diagram of a decision support and control system. A hazard avoidance system, such as Combat System 25, comprises software and computing hardware, such as x64 Commercial-Off-the-Shelf servers. Element 21 represents the systems that automatically push data to the hazard avoidance system such as Combat System 25. This includes the Radar Sensor Systems 22, Integrated Weapon Systems 23, and External Geographic Data 17. Manual processes also push data for weapon systems 27 that do not automatically provide data to the Combat System 25. Information from the Combat System 25 is sent to the Operator Console/System 24 where it is presented on a Graphical User Interface 34. Information is also sent to the Analysis System 28. The analysis system comprises of various software models 29, including the Surface Warfare Model 91, Secondary Effect Analysis Model 44, and Path Generation Module 77; the software can be stored on a Recording Medium, or Hard Disk Drives 26 and executed on Computing Hardware 32. The outputs of the Analysis system are also sent to the Operator Console to be displayed on the Graphical User Interface 35. The Operator 36 inputs commands through the Graphical User Interface 34, which then sends movement commands to the Ship Drive System 38 and engagement commands to the Combat System 25 while updating the Analysis System 28 with up-to-date information, such as the position of the ship, the position of attackers, movement commands, and engagement commands, among other information. The movement commands may include movement commands to avoid one or more threats, such as hazards or attackers.

The Ship Drive System 38 is one example of a platform drive system that may include a propulsion system that propels (e.g., causes to move) a platform, such as a ship, vehicle, airplane, or any other suitable platform. Examples of a propulsion system may include, for example, vehicle propulsion systems such as engines, airplane propulsion systems, and any other systems that propel a platform. A platform drive system may also include a directional guidance system, such as a steering system, to control movement, such as speed and direction, of the platform. For example, a platform may include a driving wheel and accelerator pedal as part of its directional guidance system.

Figure 3:
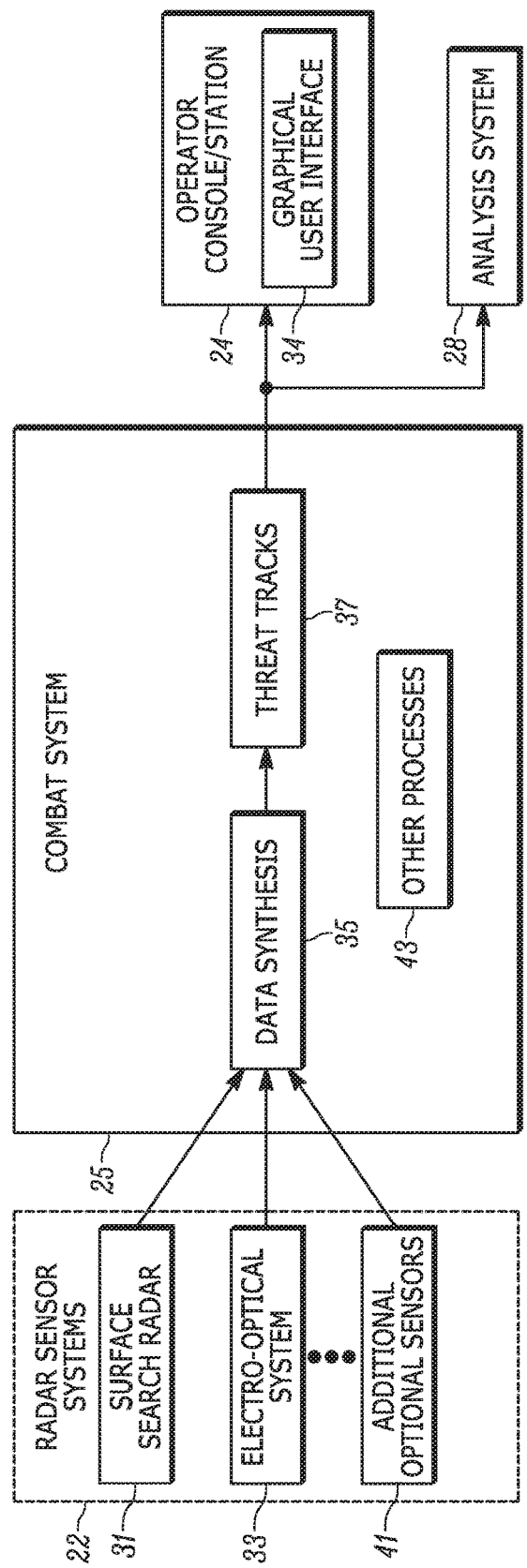
FIG. 3 shows an exemplary data flow for creating Threat Track data.

FIG. 3 shows the data flow for generating a unified Threat Track data structure. A platform may have multiple Radar Sensor Systems 22, including a Surface Search Radar 31, an Electro-optical System 33, and Additional Optional Sensors 41. Data from the multiple sensors is sent to the Combat System 25 where Data Synthesis 35 takes place, creating one or more Threat Tracks 37 (e.g., such as a threat track data structure). Threat Tracks 37 gets passed to the Operator Console/Station 24 to be displayed on the Graphical User Interface 34, and is also sent to the Analysis System 28. Combat System 25 can be configured for executing Other Processes 43 at this time as well.

Figure 4:
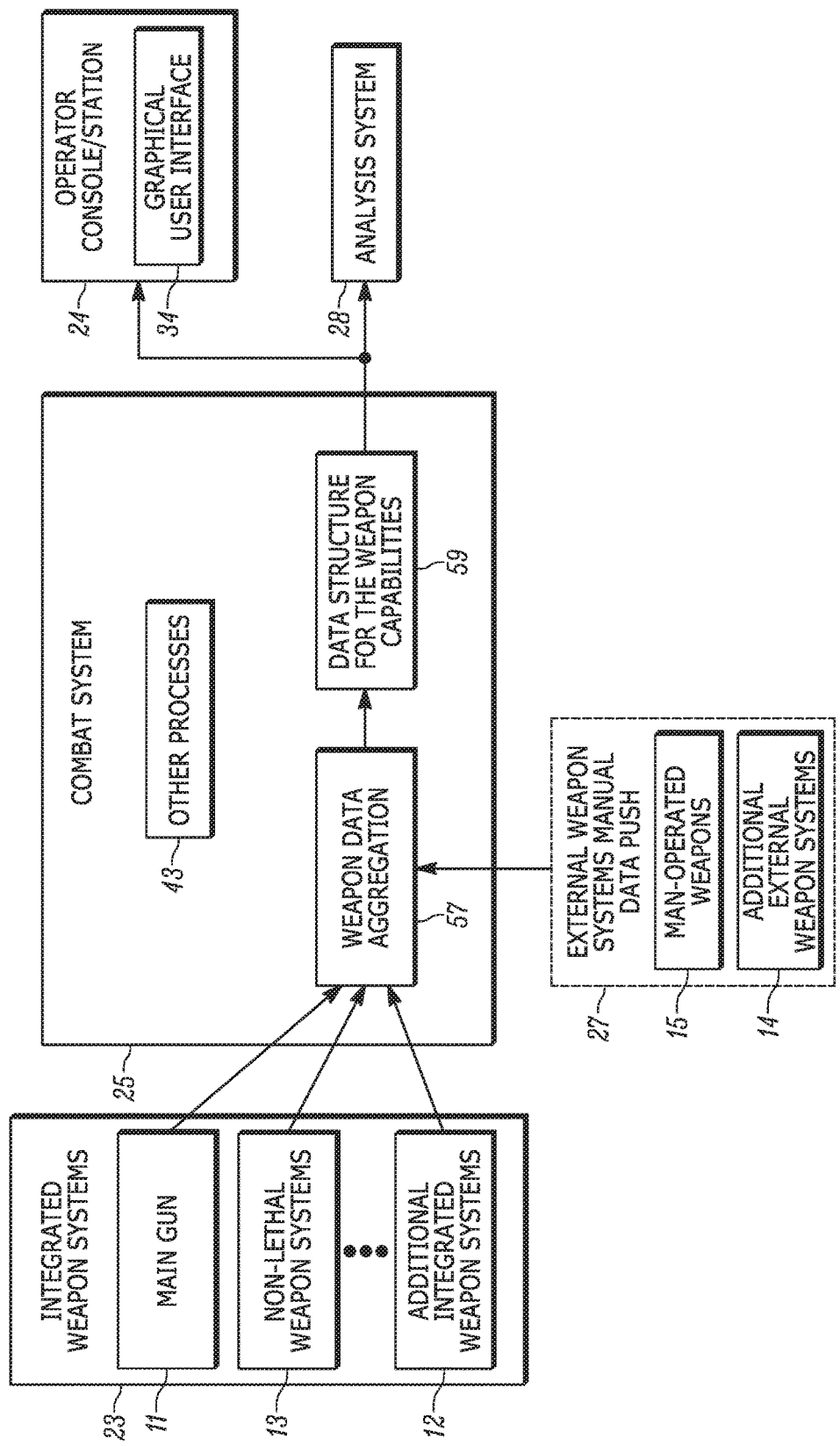
FIG. 4 shows an exemplary data flow for collecting the Weapon Capabilities data.

FIG. 4 illustrates an exemplary aggregation of weapon capabilities into a single data structure that contains information on the capabilities for all the ship's weapons. Integrated Weapon Systems 23 can include the Main Gun 11, Non-lethal Weapon Systems 13, and Additional Integrated Weapon Systems 12 automatically provide their performance capabilities to the Combat System 25. For weapon systems not integrated with the Combat System 25, External Weapon Systems require a Manual data push 27. Systems that would require a manual data push include Man-Operated Weapons 15 and Additional External Weapon Systems 14. Data from the multiple weapons goes through a Weapon Data Aggregation 57 to create the Data Structure for the Weapon Capabilities 59. This information is sent to the Analysis System 28 as well as the Operator Console/Station 24 for display on the Graphical User Interface 34. Combat System 25 can be configured for executing Other Processes 43 at this time as well.

Figure 5:
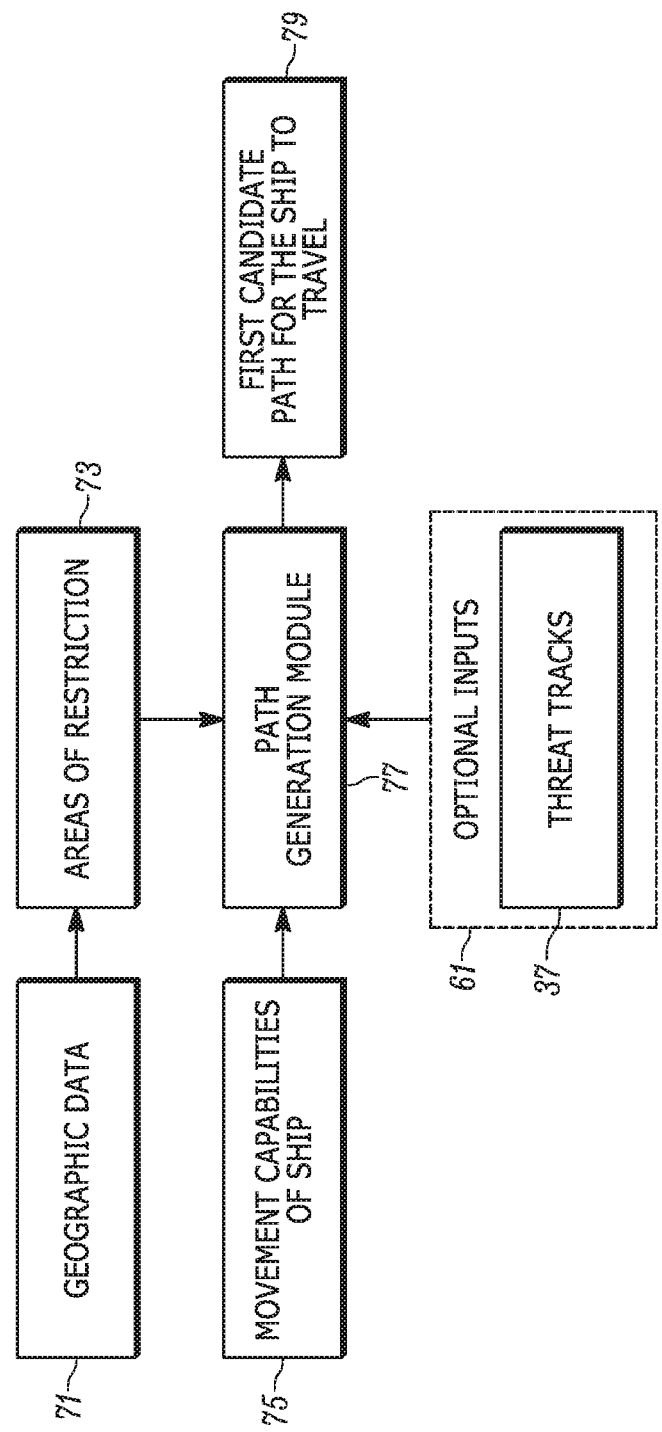
FIG. 5 shows an exemplary data flow for generating the first candidate path for the ship.

FIG. 5 shows an exemplary generation of a candidate path 79. Available geographic data 71 is used to identify areas of restriction 73 for the ship. For example, a military ship may not be able to pass into water that is too shallow or territories of other countries. The Movement Capabilities of the Ship 75 is also necessary since different craft have different turning, acceleration, and maximum speeds. Optional Inputs 61, such as the Threat Tracks 37, 75 and 73 are input into the Path Generation Module 77 to create a Candidate Path for the Ship to Travel 79.

Figure 6:
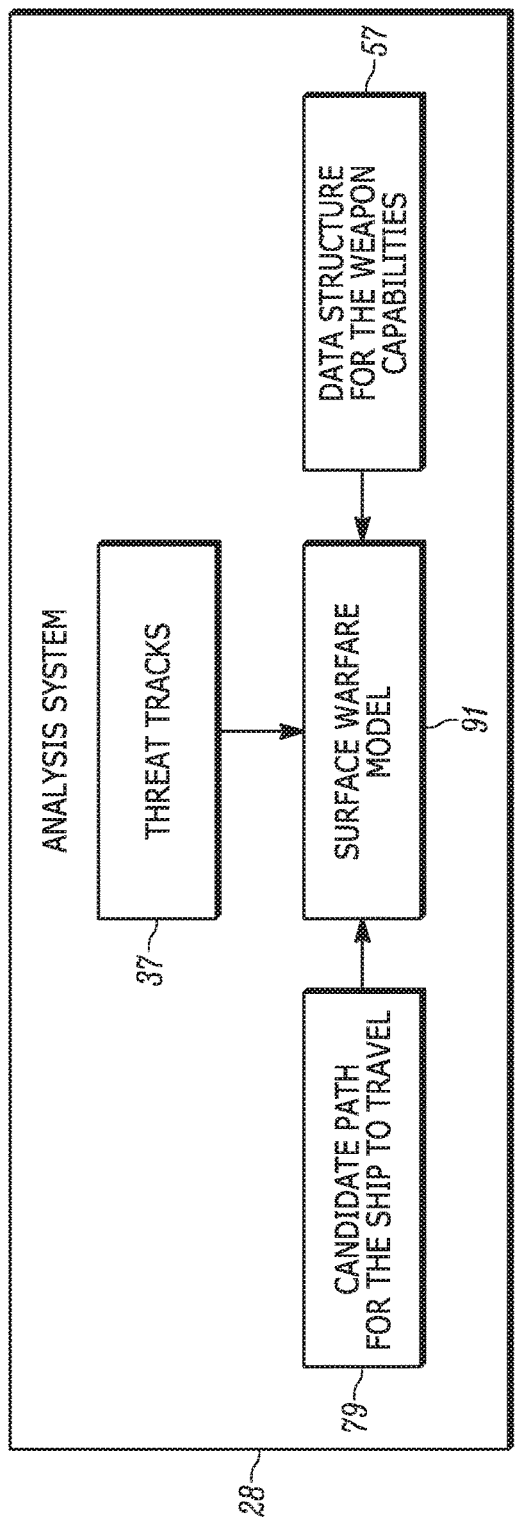
FIG. 6 shows an exemplary data flow for the Surface Warfare model module.

FIG. 6 shows an exemplary data flow of applicable information into the Surface Warfare Model module 91. The Threat Tracks 37 from FIG. 3, Data Structure for the Weapon Capabilities 59 from FIG. 4, and Candidate Path for the ship to travel 79 from FIG. 5 are passed to the Surface Warfare Model module 91. Such exemplary processing can occur within the Analysis System 28.

Figure 7:
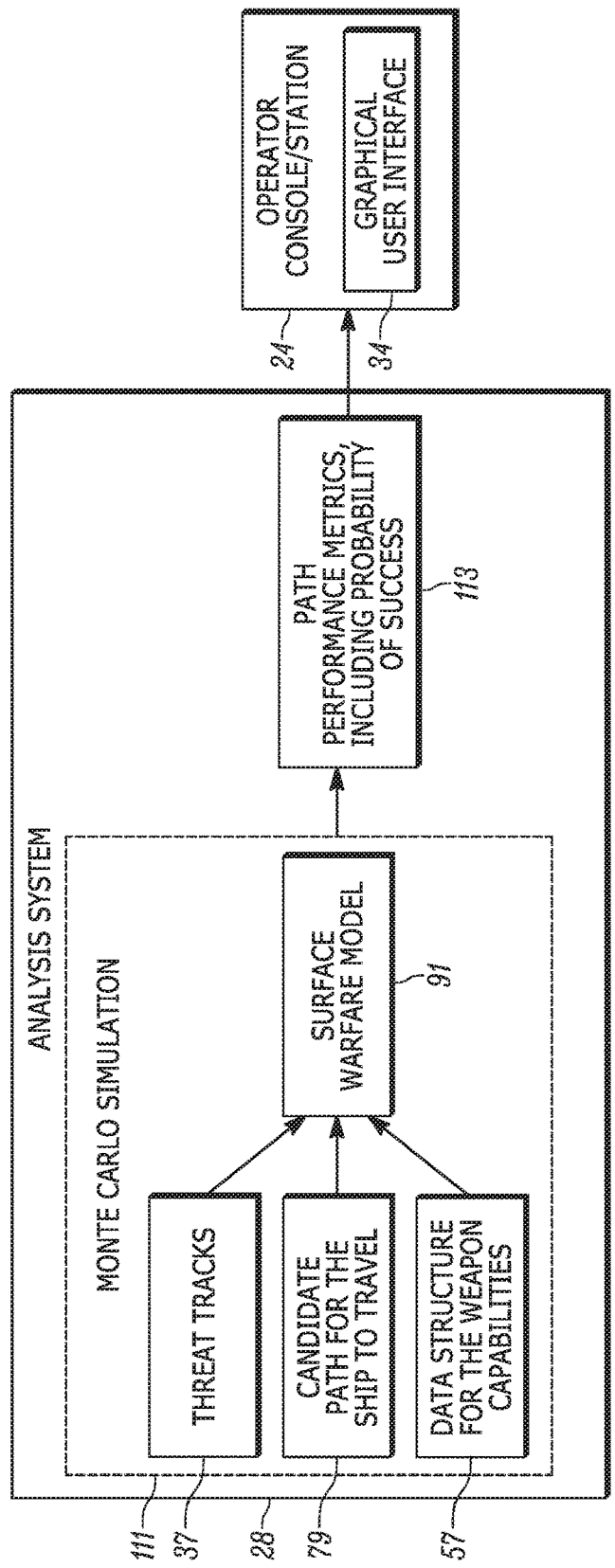
FIG. 7 shows an exemplary Monte Carlo simulation process for generating Path Performance Metrics.

FIG. 7 shows exemplary performance of a Monte Carlo Simulation 111 around the Surface Warfare Model module 91 to calculate Path Performance Metrics 113. In this example, each weapon has some probability to hit its target in each engagement. The Surface Warfare Model module is executed multiple times to calculate expected performance metrics to increase reliability of results. The exemplary process of performing multiple simulations to calculate expected metrics can be referenced as a Monte Carlo simulation. Desired accuracy for exemplary metrics can influence a number of Monte Carlo simulations performed, but accuracy must be balanced with computation time. A particularly useful performance metric in this application is Probability of Success. Once the Path Performance Metrics have been calculated, they are sent to the Operator Console/Station 24 to be displayed on the Graphical User Interface 34.

Figure 8:
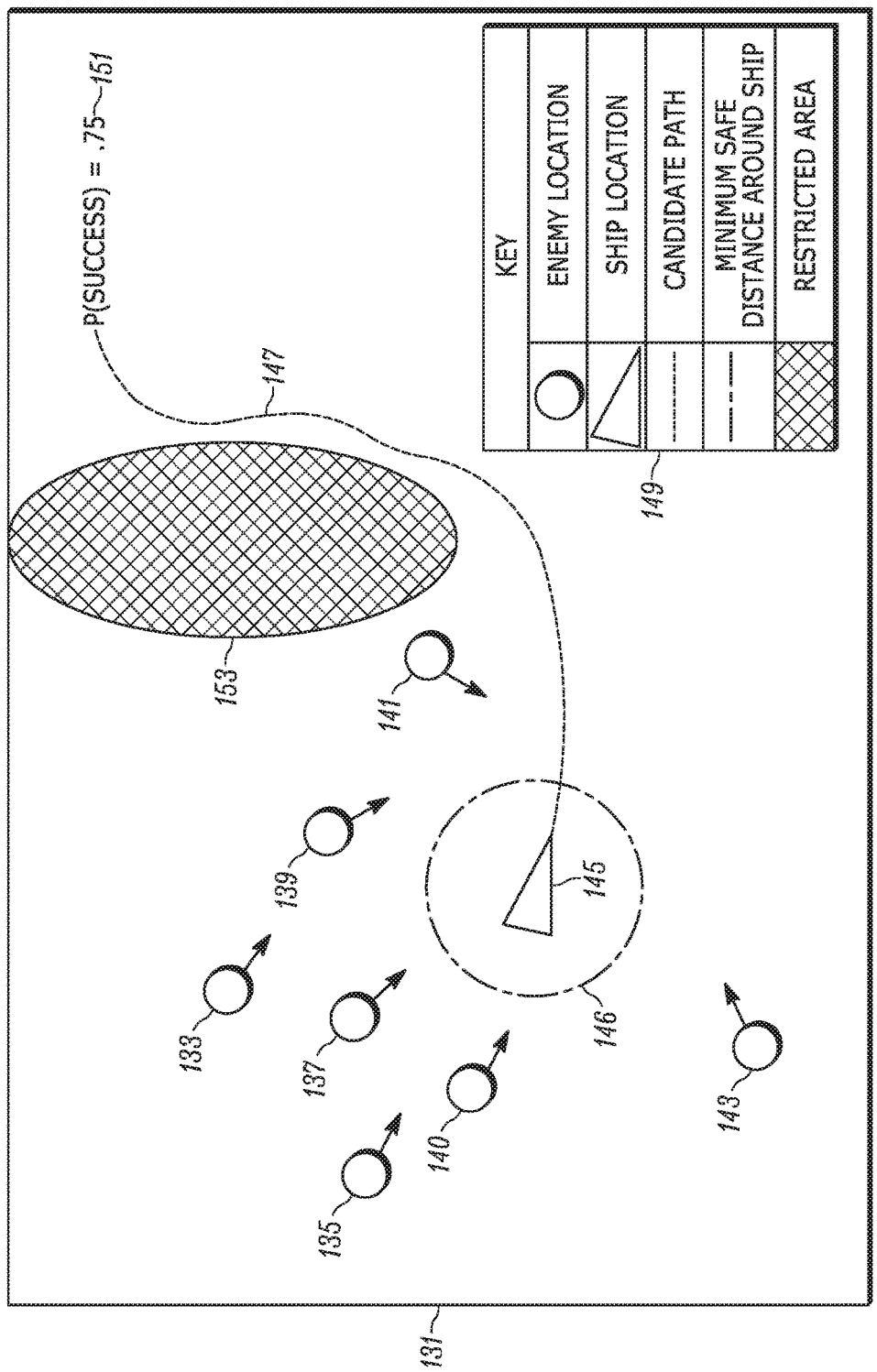
FIG. 8 shows the ship and its initial path, path performance metric, threat locations, and areas of restriction plotted on an illustrative Graphical User Interface.

FIG. 8 shows an exemplary Graphical User Interface presentation of an exemplary path for a ship with its calculated performance metric. Display system 131 displays information using, e.g., a computer monitor or other display screen. Enemy attackers 133, 135, 137, 139, 140, 141, 143, and a ship 145 is shown with locations represented by circles and their trajectories shown as arrows coming out of the circles. A minimum safe distance the attackers must stay out of around the ship can be shown by a dashed circle with the label 146. An exemplary restricted area 153 identifies an area the ship cannot travel through. An explicit plot for a candidate path 147 can be plotted from a tip of the ship to indicate a path the ship would traverse. Probability of success 151 is shown next to the candidate path; an alternative is to color the path using a scale based off the probability of success. A key 149 for the plot is also shown.

Figure 9:
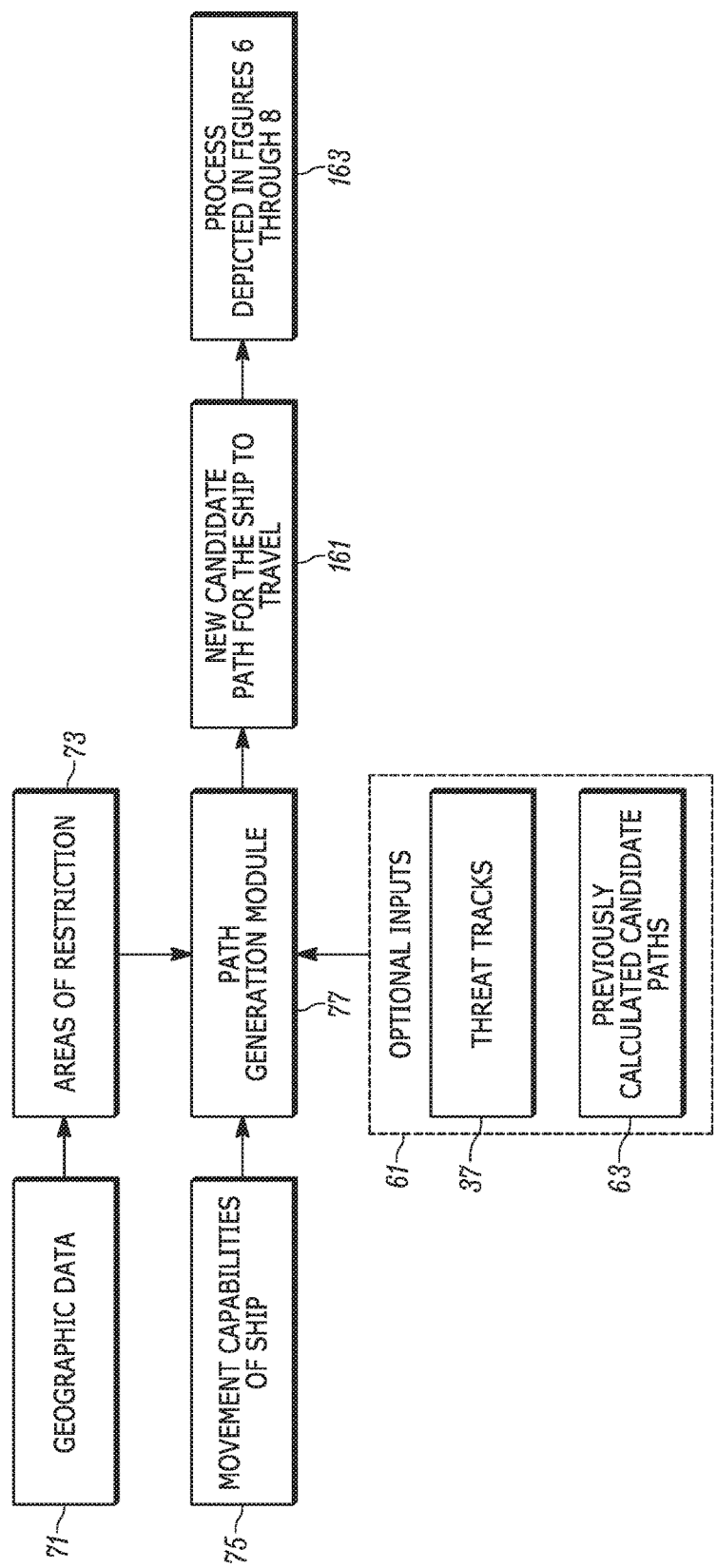
FIG. 9 shows the flow diagram for a new candidate path to be generated and passed through the same process described in FIGS. 5-7.

FIG. 9 is similar to FIG. 5 but a new, different candidate path 161 is generated. Since there is now candidate path that has been calculated, an additional Optional Input titled Previously Calculated Candidate Paths 63 can be included. A Path Generation Module 77 that uses some form of optimization section can operate so that the Previously Calculated Candidate Paths can be used to generate new candidate paths. This new candidate path then goes through a process 163 described in, e.g., FIG. 6-FIG. 8.

Figure 10:
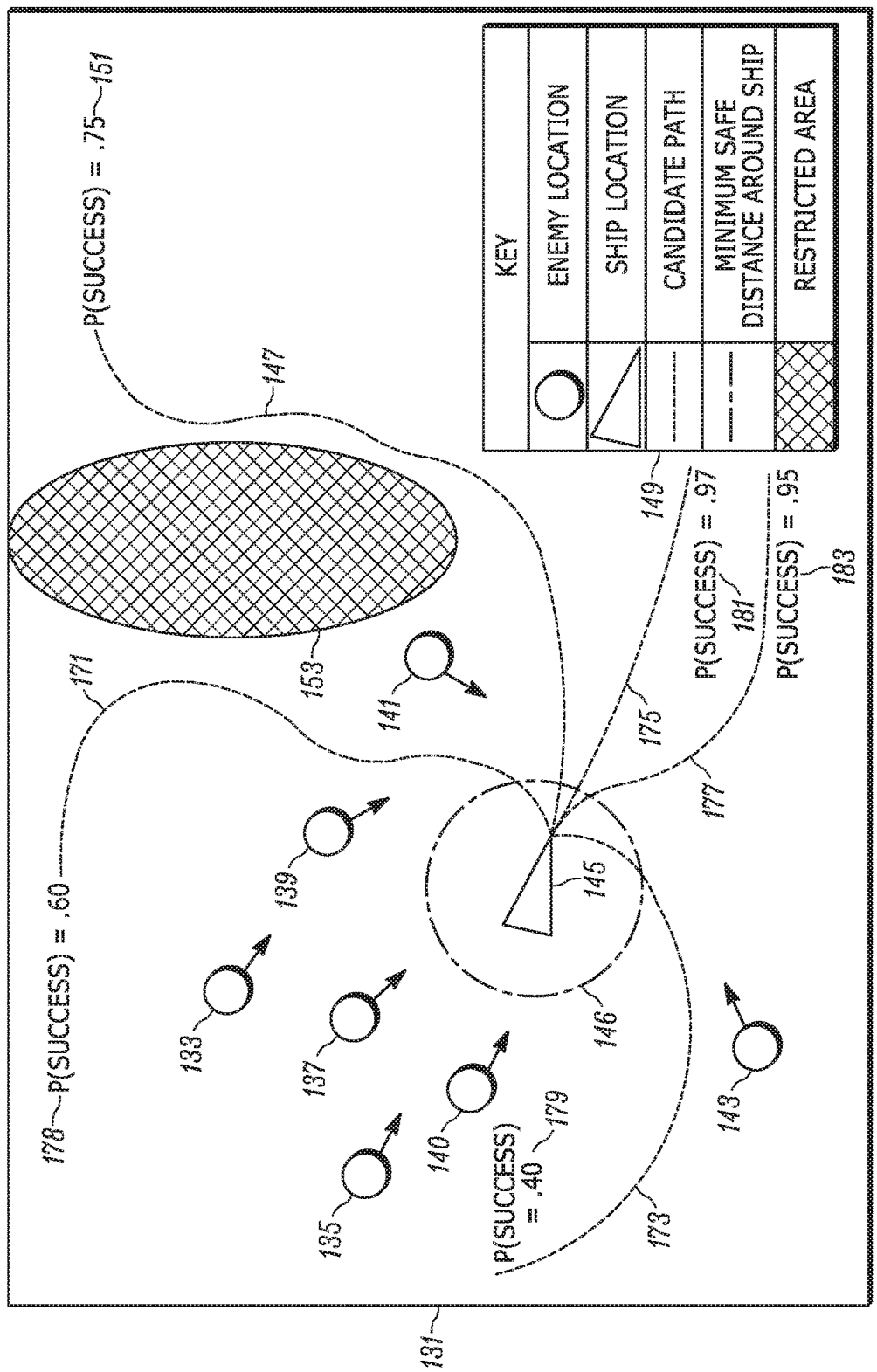
FIG. 10 shows an illustrative Graphical User Interface from FIG. 8 with more candidate paths and their performance metrics.

FIG. 10 shows an exemplary Graphical User Interface display from FIG. 8 with more candidate paths 171, 173, 175, 177, and their respective probabilities of success 178, 179, 181, 183. These exemplary candidate paths can also be color-coded based off their respective success probabilities using a scale; for example, paths with probability of success greater than 90% are colored green, paths with probabilities of success between 50% and 90% would be yellow, and paths with probabilities of success less than 50% would be red. Using that scale, paths 181 and 183 would be colored green; paths 171 and 151 would be yellow; and path 173 would be red.

Figure 11:
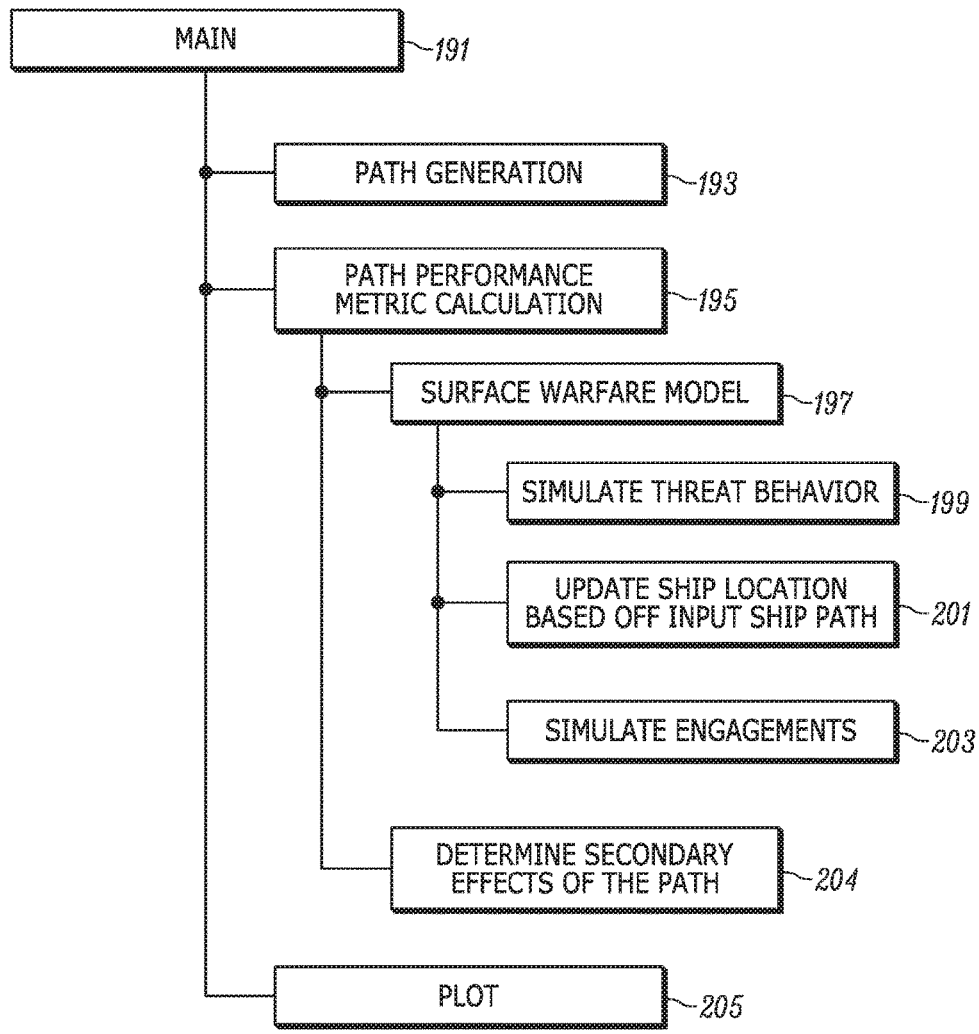
FIG. 11 shows the Level 2 breakdown of the computer code modules.

FIG. 11 shows a high level overview of exemplary computer code components used in an exemplary embodiment, e.g., an Analysis System. An exemplary main module 191 is shown that contains various subroutines. A candidate path generation module 193 is shown that generates exemplary candidate path(s) data. The candidate path data is then sent to the Path Performance Metric Calculation module 195 that includes a Surface Warfare Model 197, which contains subroutines to Simulate Threat Behavior 199, update the ship location based off the input ship path 201, and the Simulation of Engagements 203. The candidate path(s) data can then be passed through software to determine secondary effects in code module 204. Examples of secondary effects include whether the path will lead the attackers to sensitive friendly units (such as an aircraft carrier or Marine landing vessel), whether the path will use too much fuel for the ship to continue its mission, if there is a risk of causing an environmental catastrophe (such as hitting an oil tanker or drilling platform with a weapon), and if cultural artifacts are threatened (statues, lighthouses, Colossus of Rhodes, etc.). Alternatively, the candidate path can be checked against external intelligence services, to identify geographically related information such as, e.g., if the ship or platform will be going into an elevated or high risk geographic areas based on a plurality of data associated with the geographic area including news source parsers which look for key words and a geographic reference then associate that key word and a related predetermined symbol relative to a Candidate Path (CP) in a predetermined secondary effect vulnerability or risk range of any given candidate path along with a secondary effect risk identifier and vulnerability data. Such secondary effect data can be used to display a secondary effect data associated with an affected candidate path, if any, within the secondary effect risk identifier and vulnerability data. As candidate paths are created and their performance metrics are calculated, they are passed to the Plot module 205 for presentation.

FIGS. 12A and 12B illustrate an exemplary module in pseudo-code format for generating candidate paths for the ship to travel. FIG. 12 includes paths that are relatively simple and assumes no data is available, generating a path randomly from the movement capabilities of the ship. Code block 231 finds maximum left and right turns the ship can make. Code block 233 contains a maximum number of iterations for a candidate path creation loop and the input heading for the ship theta 235 that include code that initializes data structures for storing velocity vectors so that various candidate path ship paths can be created by the loop. Main candidate path generation code block 237 can be a main path generation loop, randomly choosing right or left turns first, then rotating related vector(s) by a heading of the ship to update velocity vector data structure(s). From there, the velocity vector can be added to the ship location to update the ship's new location. Code block 239 checks to see if the updated ship location is outside the exclusion area; if it is the ship location is valid, the heading is updated, and the location is appended to the ship path data structure. If the ship location is invalid, the path generation loop will start over. Code block 241 checks to make sure the path is of the appropriate length and it stays in valid locations.

FIG. 13 shows an alternative path generation module in pseudo-code format that incorporates an optimization algorithm for generation of new paths, using information from previous paths. Code block 261 initializes the solution set with candidate solutions using a path creation function. This path creation function can be done in a similar manner to FIG. 12 or some other path generation technique (for example, using different waypoints the ship travels to, or assigning different weights to the enemies and then having the vector be a weighted sum of the enemy approach vectors). Code block 263 then calculates the path performance characteristics of each candidate path. Code block 265 sorts the candidate solutions in decreasing order of probability of success. Code block 267 iterates through multiple generations of the optimization algorithm. Code block 269 shows the generation of new paths and the calculation of their performances. A number of optimization algorithms can be used to create new paths, including a Genetic Algorithm, Particle Swarm Optimization, Branching Tree Search, or Nelder-Mead Downhill Simplex. These algorithms allow for computing resources to be allocated more efficiently to calculate paths with good performance metrics. Code block 269 also sends the candidate path the function that evaluates the secondary effects. 271 sorts the candidate solutions before the next iteration executes.

FIG. 14 shows exemplary pseudo-code demonstrating the Monte Carlo simulation around the Surface Warfare Model for the calculation of Path Performance Metrics. Code block 291 is the Monte Carlo loop that executes the surface warfare model and stores the outputs of the model. Code block 293 uses the outputs of the surface warfare model and calculates various performance characteristics, including the probability of success.

FIG. 15 shows exemplary pseudo-code for the Surface Warfare Model. Code block 311 includes the name of the function and its inputs and outputs. Code block 313 updates the ship location from the input path. Code block 315 updates the locations of the attacking small boat swarm. Code block 317 loops through the multiple weapons of the ship and simulates the weapons engaging the threats. Enemies that are destroyed are removed from the simulation. Code block 318 determines whether any enemies remain and, if not, the simulation ends. Code block 319 checks to see if any of the attackers have made it within range to attack the ship; if so it is considered a "loss" scenario. Code block 321 stores the outputs of the model.

FIG. 16 shows exemplary pseudo-code for function that updates the attacking boats' locations. Code block 341 creates a matrix with rows that represent the directions from the attackers to the ship; each row represents an attacker while the first column represents the x-direction and the second column represents the y-direction. Code block 343 normalizes the direction vectors to a unit length. Code block 345 updates the locations using the previous locations and adding the unit direction vectors that are scaled by the speed of the threats.

FIGS. 17A and 17B show exemplary pseudo-code for a function that simulates the engagements for each of the weapons onboard the ship. Code block 361 calculates a distance vector that that represents the distance between each boat and the ship. Code block 363 identifies the closest boat, which will be engaged. Code block 365 simulates the impact of the weapon by rotating a vector from the ship by a random angle, modeled as a Normal random variable with mean equal to 0 and standard deviation equal to a predetermined number, stored in the Weapon Characteristics data structure. Code block 367 determines the distance between the simulated hit coordinates and the attacking boats and determines what boats are within the blast radius of the weapon. The blast radius is also stored in the Weapon Characteristics data structure. Code block 369 then removes any boats that were within the blast radius from the data structure that contains all the locations for the attacking swarm of boats.

FIG. 18 shows exemplary pseudo-code for the function that plots the paths on the user interface. Code block 381 activates the user interface and tells it to plot all the subsequent plotting commands. Code block 383 plots the candidate path that has gone through the process described in FIG. 11 as a blue dashed line. Code block 385 plots the current enemy locations as red circles. Code 387 places a text box that contains the calculated probability of success at the end of the candidate path.

FIG. 19 lists exemplary Global Variables used throughout exemplary Analysis system. Variable table 420 is shown with the Variable Names and their Descriptions. Variables include shipPath variable 421, and shipPath description 423. VelocityVectors variable 425 and velocityVectors description 427 are also shown. Performance.[ ] variable 429 and performance.[ ] description 431 are also shown. Performance.ProbSuccess variable 433 and performance.ProbSuccess description 435 are also shown. Performance.expectedTime variable 437 and performance.expectedTime description 439 are also shown. Performance.expectedEnemiesDestroyed variable 441 and performance.expectedEnemiesDestroyed description 433 are also shown. Performance.Raw variable 445 and performance.Raw description 447 are also shown. SUW_Inputs.[ ] variable 449 and SUW_Inputs.[ ] description 451 are also shown, along with SUW_Inputs.swarmLocations variable 453 and SUW_Inputs.swarmLocations description 455. ShipLocation variable 457 and shipLocation description 459 are also shown. C variable 461 and c description 463 are also shown.

Figure 20A:
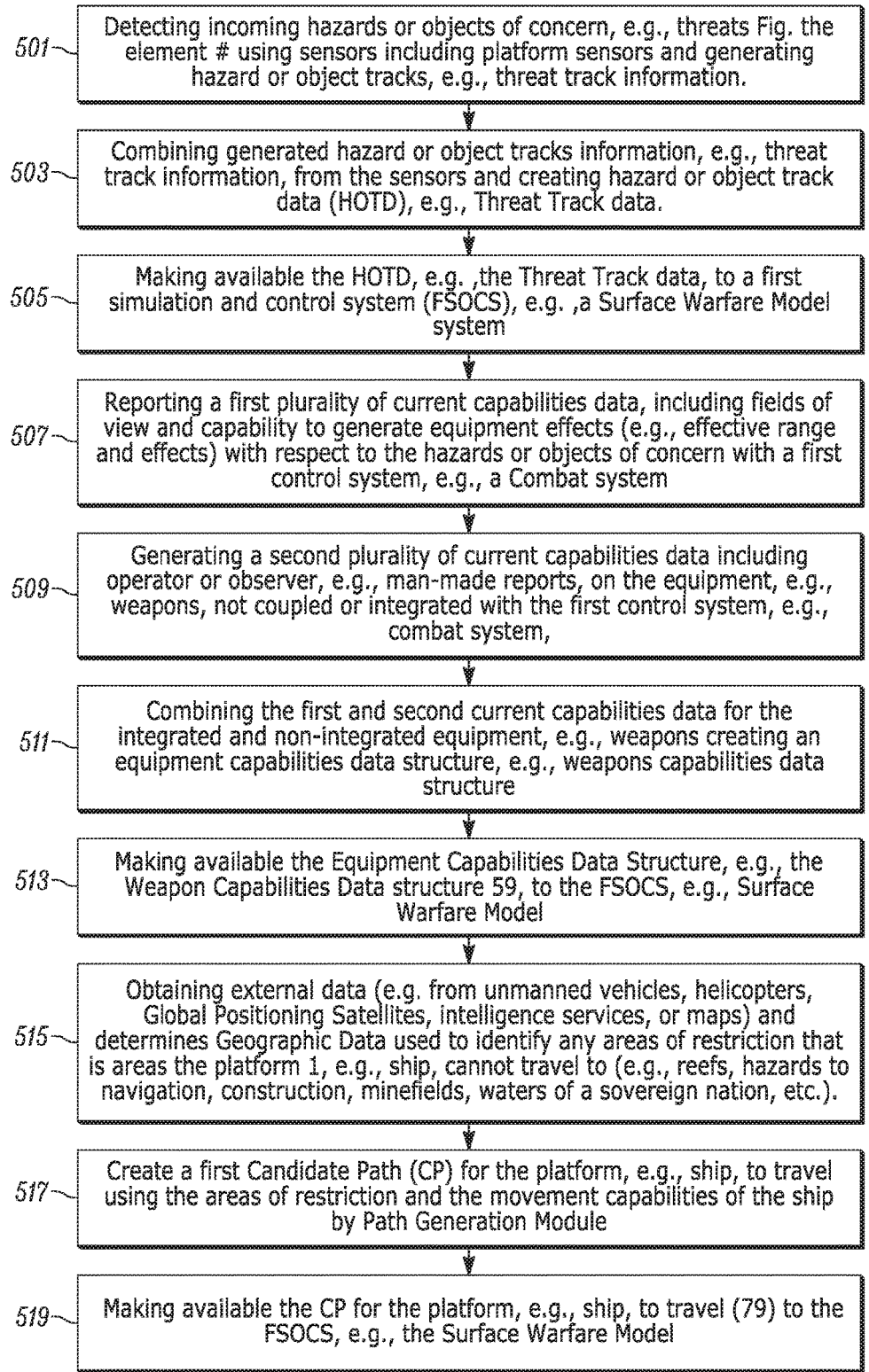
FIG. 20A shows a first segment of an exemplary method in accordance with an embodiment of the invention.
Figure 20C:
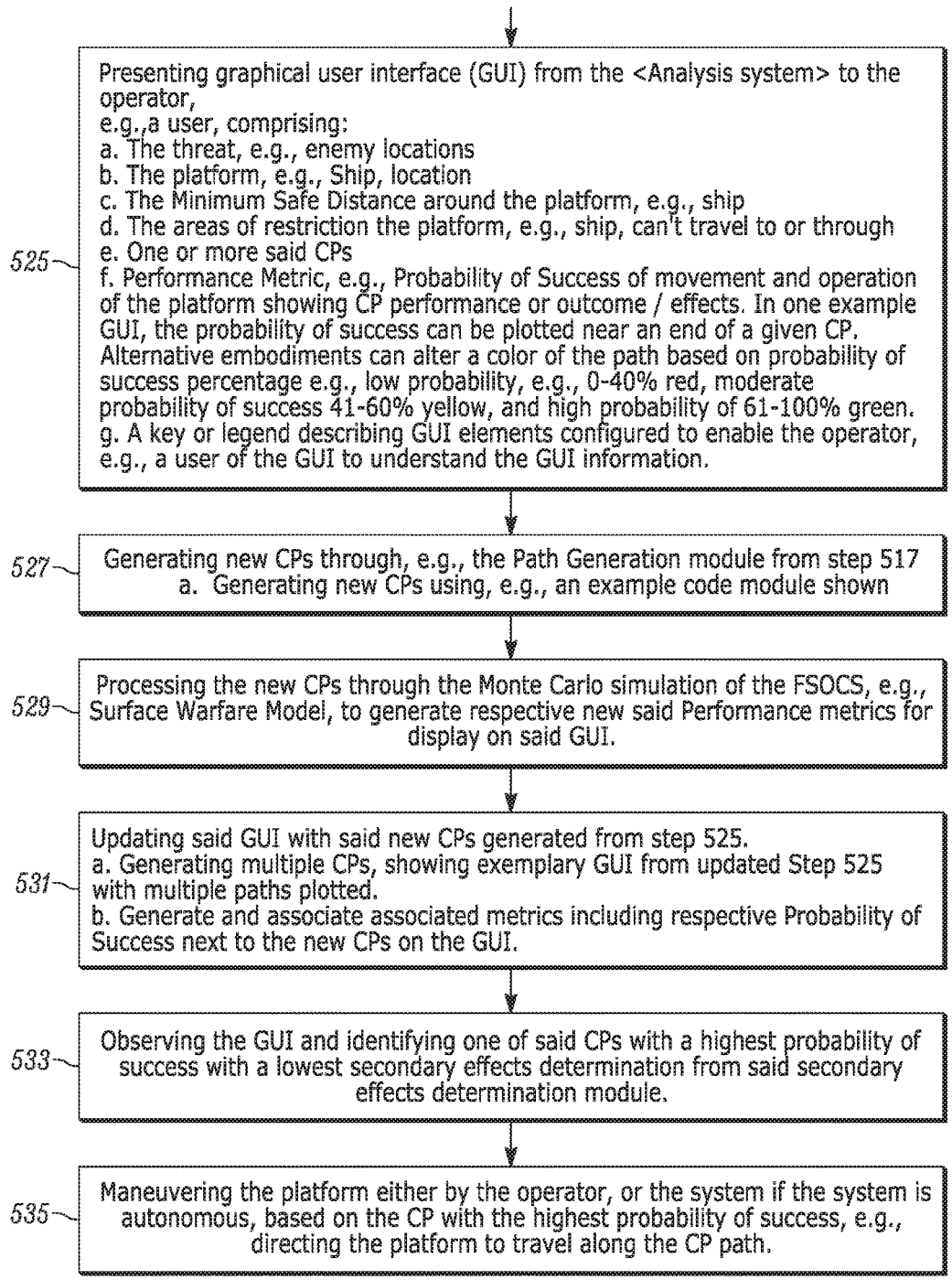
FIG. 20C shows another continuation of the FIG. 20B method.

FIGS. 20A, 20B, and 20C show an exemplary method in accordance with one embodiment of the invention. Referring to FIG. 20A, at step 501, hazards or objects of concern, e.g., threats (e.g., FIG. 1, item 3) are detected using sensors including platform (e.g., FIG. 1, item 1) sensors (e.g., FIG. 1, items 7, 9) and hazard or object tracks are generated (e.g., threat track information). The hazards may include, for example, attackers, vehicles, missiles, areas of danger, or any other hazard. At step 503, the generated hazard or object tracks information, e.g., threat track information, is combined from the sensors (e.g., see, FIG. 3) and hazard or object track data (HOTD) (e.g., Threat Track data) is created. At step 505, the HOTD is made available to a first simulation and control system (FSOCS) (e.g. a Surface Warfare Model system as shown in FIG. 6). Proceeding to step 507, a first plurality of current capabilities data, including fields of view and capability to generate equipment effects (e.g., effective range and effects) with respect to the hazards or objects of concern, are reported to a first control system, e.g., a Combat system (e.g., FIG. 2, item 25). At step 509 a second plurality of current capabilities data is generated including operator or observer, e.g., man-made reports, on the equipment, e.g., weapons, not coupled or integrated with the first control system, e.g., combat system (e.g., see FIG. 3, item 15). At step 511 the first and second current capabilities data for the integrated and non-integrated equipment (e.g., weapons such as shown in FIG. 4) is combined creating an equipment capabilities data structure, e.g., weapon capabilities data structure (e.g., see FIG. 4, item 59).

At step 513 the Equipment Capabilities Data structure (e.g., FIG. 4, Weapon Capabilities Data structure 59), is made available to the FSOCS (e.g., the Surface Warfare Model of FIG. 6). At step 515 external geographic data (e.g., FIG. 2, item 17) is obtained (e.g. from unmanned vehicles, helicopters, Global Positioning Satellites, intelligence services, or maps) and used to determine Geographic Data (e.g., FIG. 5, item 71) to identify any areas of restriction (e.g., FIG. 5, item 73), that is areas the platform 1 (e.g., ship) cannot travel to (e.g., the areas of restriction may include reefs, hazards to navigation, construction, minefields, waters of a sovereign nation, etc.). At step 517 a first Candidate Path (CP) is created for the platform to travel (e.g., FIG. 5, item 79) using the areas of restriction (e.g., FIG. 5, item 73) and the movement capabilities of the ship (e.g., FIG. 5, item 75) by a Path Generation Module (e.g., FIG. 5, item 77) (See, e.g., FIG. 5, and FIGS. 10-19 exemplifying a code listing, as well as the exemplary path generation system shown in FIG. 11). At step 519 the CP for the platform, e.g., ship, to travel is made available to the FSOCS, e.g., the Surface Warfare Model (e.g., see FIG. 6).

Referring to FIG. 20B, the method of FIG. 20A continues as follows. At step 523 performance metrics are calculated through use of a Monte Carlo simulation section in the FSOCS, (e.g., Surface Warfare Model) based on inputs comprising the first capabilities data, second capabilities data, the external data, and the HOTD based on the following process (e.g., as shown in FIG. 7 and FIGS. 10-18, showing calculations including those shown in FIG. 13):

a. The Monte Carlo simulation executes the FSOCS, e.g., the Surface Warfare Model, repeatedly to calculate expected values (e.g., see FIG. 13).

b. A platform movement scenario is simulated using the FSOCS, e.g., Surface Warfare Model, which simulates a movement of said platform scenario (e.g., see FIG. 14) that comprises operating exemplary sub-modules comprising: i. Simulate hazard or object module, e.g., Threat, Behavior (e.g., see FIG. 15) that calculates an approach vector for each hazard, object, or threat with respect to the platform. ii. A simulate engagements module (e.g., see FIG. 16) simulates engagements by the platform using equipment (e.g., weapons) onboard the platform with respect to the equipment's capacity to interact with the hazards or objects to, e.g., a standard deviation. After engagement data from the equipment (e.g. weapon's hit coordinate) is determined, any hazards, objects, or threats that are within the equipment's interaction zone (e.g., effect of the weapon's blast radius) is eliminated, altered, or destroyed, and then removed as a hazard. iii. The Platform's location module is then updated using an updated input CP and a current time of the simulation. iv. A scenario result designation module then designates one or more said CPs, or the platform movement scenario simulation run, as ineffective (e.g., all CPs falling below a predetermined percentage of success) based on, e.g., a loss or unacceptable damage to the platform, or whether any hazard or object (e.g., one or more said threats from an enemy) is within a Minimum Safe Distance (e.g., rocket propelled range (e.g., rpg_range variable)) v. A secondary effects determination module (e.g., FIG. 2, item 44) then designates or determines one or more secondary effects associated with said hazards or objects which have a secondary effect designator and an impact level comprising a degree of harm identifier associated with harm to the hazards or objects if they are damaged or harmed.

Referring to FIG. 20C, the method of FIG. 20B continues as follows. At Step 525, a Graphical User Interface (GUI) is presented to an operator (e.g., a user of the system) comprising: a. The threat, e.g., enemy locations (e.g., FIG. 1, items 135, 137, 139); b. The platform, e.g., Ship, location (FIG. 1, item 145); c. The Minimum Safe Distance around the platform, e.g., ship (e.g., FIG. 1, item 146); d. The areas of restriction the platform, e.g., ship, can't travel to or through (e.g., FIG. 1, item 153); e. One or more said CPs (e.g., FIG. 1, item 147); f. Performance Metric, e.g., Probability of Success of movement and operation of the platform (e.g., FIG. 1, item 151) showing CP performance or outcome/effects. In one example GUI, the probability of success can be plotted near an end of a given CP. Alternative embodiments can alter a color of the CPs based on probability of success percentage (e.g. low probability, e.g., 0-40% red, moderate probability of success 41-60% yellow, and high probability of 61-100% green). In another example, the GUI may flash, make brighter, or draw thicker lines, of the preferred, or a number of top preferred, CPs.; g. A key or legend describing GUI elements configured to enable the operator (e.g., a user of the GUI) to understand the GUI information.

Proceeding to step 527, new CPs are generated through, e.g., the Path Generation module from step 517 (e.g., see FIG. 11). For example, the process may include generating new CPs using, e.g., an example code module as shown, e.g., at FIG. 12. At Step 529, the new CPs are processed through the Monte Carlo simulation of the FSOCS, e.g., Surface Warfare Model, to generate respective new performance metrics for display on said GUI. Proceeding to step 531 the GUI is updated with the new CPs generated from Step 525. For example, the process may include a. Generating multiple CPs (e.g., see FIG. 10 showing exemplary GUI from updated Step 525 with multiple paths plotted). b. Generating and associating associated metrics including respective Probability of Success next to the new CPs on the GUI. At step 533, the GUI is observed (e.g., by the operator of the system) and one of the CPs is identified with a highest probability of success, along with a lowest secondary effects determination from said secondary effects determination module. At step 535, the operator, or the system if the system is autonomous as contemplated herein, maneuvers the platform based on the CP with the highest probability of success (e.g. directs the platform to travel along the CP path).

Figure 21:
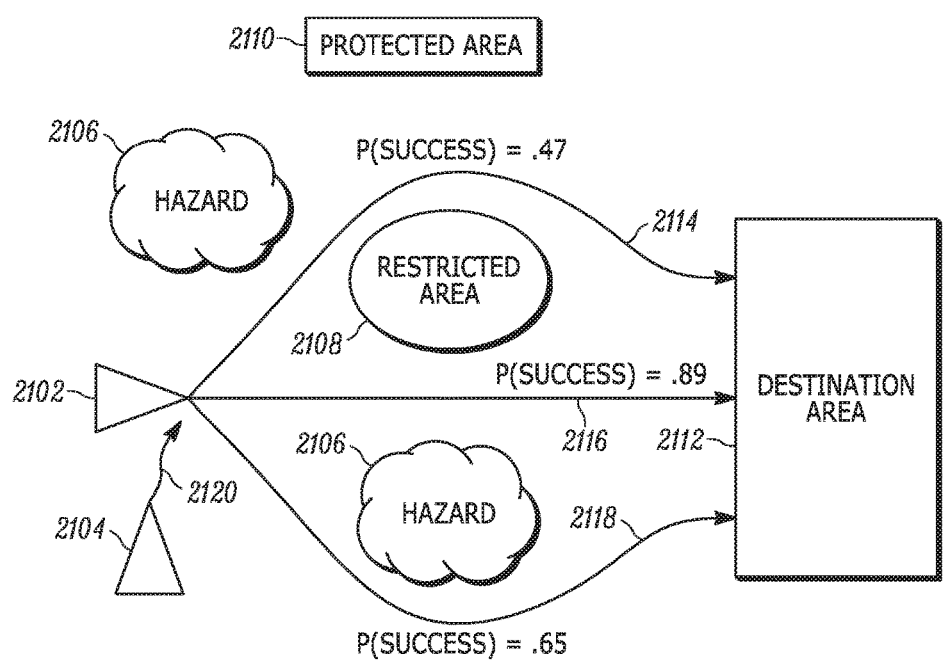
FIG. 21 shows an exemplary platform attempting to reach a destination area.

FIG. 21 illustrates a GUI representation of a plurality of candidate paths 2114, 2116, 2118 that a platform 2102 may take to reach a destination area 2112. The example platform 2102 may be, for example, a land-based platform, a water-based platform, or an air-based platform, or any other suitable platform, such as a moveable platform. For example, a land-based platform can include a car, a truck, or any other land-based platform. In one example, a land-based platform such as a car attempts to reach destination area 2112 in the shortest amount of time. In another example, platform 2102 can be a firefighting vehicle attempting to reach a fire located at destination area 2112. The land-based platform may need to navigate amongst hazard areas 2106, which can include stationary or non-stationary hazards. Stationary hazards may include, for example, trees, houses, power lines, buildings, or any other stationary hazard. Non-stationary hazards can include, for example, other land-based platforms, such as other cars, areas under fire, flooding areas, or any other non-stationary hazards. In another example, platform 2102 is a vehicle attempting to reach destination area 2112, where hazard areas 2106 include traffic areas.

A water-based platform can include, for example, a boat, a ship, a jet-ski, or any other suitable water-based platform. In one example, the water-based platform attempts to reach destination area 2112 by avoiding hazard areas 2106, which can include ocean reefs, schools of fish, or any stationary or non-stationary area that may present a hazard to platform 2102. An air-based platform can include a drone, a spaceship, an airplane, a helicopter, or any other air-based platform. In one example, platform 2102, in this case a drone, attempts a delivery to destination area 2112. Hazards 2106 may include, for example, space junk, meteors, birds, airplanes, helicopters, other flying objects, or any area that may present a hazard to platform 2102.

The GUI representation also includes protected area 2110 and restricted area 2108 which includes area that are not to be traversed by platform 2106. For example, protected area 2110 can be any area that is to be protected, such as a forest preserver, a protected reef, or any other suitable protected area. Examples of restricted area 2108 include a no-fly zone, streets that have been closed off to vehicles, special access areas (e.g., government buildings), or any other restricted area. The GUI representation also includes other platform 2104 along with its associated hazard track 2120, where platform 2104 can be either a similar type, or different type, of platform than platform 2102.

In this example, automatic sensor data, such as radar sensor system data and external geographic data, related to hazard areas 2106, protected area 2110, restricted area 2108, and other platform 2104 is received. Non-integrated sensor system data relating to one or more of the hazard areas 2106, protected area 2110, restricted area 2108, and other platform 2104 may also be received. As illustrated, multiple candidate paths 2114, 2116, 2118 are presented where each is associated with a path performance metric. For example, candidate path 2114 is shown with a path performance metric indicating a probability of success of 0.47. Likewise, candidate path 2116 is shown with a path performance metric indicating a probability of success of 0.89, and candidate path 2118 is shown with a path performance metric indicating a probability of success of 0.65. Each probability of success may be generated based on one or more of the automatic sensor data and non-integrated sensor system data as described above.

In some examples, one or more processors executing suitable instructions stored on a computer readable medium can cause the performance of one or more functions described herein. For example, code modules, such as the ones included in the code listing attached as an appendix, may be compiled and stored on a computer readable medium. The appendix is incorporated by reference herein. The one or more processors are operable to read the computer readable medium and execute the compiled instructions. For example, the Main function can pass hazard locations, such as enemy boat locations, to an optimization algorithm, collect the results, and plot the data. The branchingRandomWalkPOutput function is an example optimization algorithm that initializes a number of paths, picks the top performers, then chooses new directions to expand on. An example of a Path Generation is presented. Once the path is generated it gets sent to the getProbSuccessVectorInput function for the calculation of the path's probability of success. The getProbSuccessVectorInput contains a Monte Carlo loop around a surface warfare model, which contains a simulation of the threat behavior, updates hazard locations (e.g., Ship Location 201), and includes simulation of engagements. The function getBoatVectors simulates threat behaviors, in this example by having an enemy travel directly toward the ship. The function getEngagement determines what enemy the ship will be shooting at and simulates a shot of its weapon. The function getUpdatedBoatLocationTweaked can determine what hazards, such as enemy boats, have been hit by a weapon and "kills" any of them off by removing them from the simulation.

Although the invention has been described in detail with reference to certain preferred embodiments, variations and modifications exist within the spirit and scope of the invention as described and defined in the following claims.

The invention claimed is:

1. A method, by at least one processor capable of executing instructions stored on a computer readable storage medium, for generating and displaying multiple transverse path options to a platform's operator in response to one or more hazards, the method comprising:

receiving, by the at least one processor from one or more automatic sensor data systems, automatic sensor data comprising radar sensor system data and external geographic data;

generating, by the at least one processor, at least one hazard track corresponding to at least one hazard's navigational route based on the radar sensor system data;

generating, by the at least one processor, area of restriction data that identifies at least one area of restriction based on the received external geographic data;

generating, by the at least one processor, a first candidate path based on the generated area of restriction data and platform movement capability data;

generating, by the at least one processor, a first path performance metric associated with the first candidate path based on the at least one hazard track; and displaying, by the at least one processor, the first candidate path and the first path performance metric.

2. The method of claim 1 wherein generating the first path performance metric associated with the first candidate path based on the at least one hazard track further comprises generating the first path performance metric associated with the first candidate path based on the first candidate path.

3. The method of claim 2 wherein generating the first path performance metric associated with the first candidate path based on the at least one hazard track and the first candidate path comprises executing a Monte Carlo simulation dependent on the at least one hazard track and the first candidate path.

4. The method of claim 1 wherein generating the first candidate path based on the generated area of restriction data and the platform movement capability data further comprises generating the first candidate path based on the at least one hazard track.

5. The method of claim 4 wherein generating the first candidate path further comprises generating the first candidate path based on at least one previously generated candidate path.

6. The method of claim 1 wherein:
generating the first path performance metric associated with the first candidate path based on the at least one hazard track comprises generating a first probability of success associated with the first candidate path; and
displaying the first candidate path and the first path performance metric comprises providing for display the first probability of success associated with the first candidate path.

7. The method of claim 1 further comprising:
generating a second candidate path based on the generated area of restriction data and platform movement capability data;
generating a second path performance metric associated with the second candidate path based on the at least one hazard track; and
displaying the second candidate path and the second path performance metric.

8. The method of claim 1 further comprising generating a second hazard track corresponding to a second hazard's navigational route based on the radar sensor system data, wherein generating the first path performance metric associated with the first candidate path based on the at least one hazard track further comprises generating the first path performance metric based on the second hazard track.

9. The method of claim 1 wherein generating the first path performance metric associated with the first candidate path based on the at least one hazard track comprises executing a Monte Carlo simulation based on the at least one hazard track.

10. The method of claim 1 wherein the received radar sensor system data comprises at least one hazard location.

11. The method of claim 1 further comprising receiving secondary effects data, wherein generating the first path performance metric associated with the first candidate path based on the at least one hazard track further comprises generating the first path performance metric associated with the first candidate path based on the received secondary effects data.

12. The method of claim 1 wherein:
generating the first path performance metric associated with the first candidate path based on the at least one hazard track comprises generating a first expected number of threats destroyed and an expected engagement time with the at least one hazard where each is associated with the first candidate path; and
displaying the first candidate path and the first path performance metric comprises displaying the first expected number of threats destroyed and the expected engagement time with the at least one hazard.

13. The method of claim 1 wherein the automatic sensor data system includes a radar sensor system that provides the radar sensor system data.

14. The method of claim 1 wherein the automatic sensor data system includes a global positioning satellite (GPS) system that provides the external geographic data.

15. A system for generating and displaying multiple transverse path options to a platform's operator in response to one or more hazards, the system comprising:
a control system configured to:
receive, from one or more automatic sensor data systems, automatic sensor data comprising radar sensor system data and external geographic data;
generate at least one hazard track corresponding to at least one hazard's navigational route based on the radar sensor system data; and
an analysis system operatively coupled to the control system and configured to:
generate area of restriction data that identifies at least one area of restriction based on the received external geographic data;
generate a first candidate path based on the generated area of restriction data and platform movement capability data;
generate a first path performance metric associated with the first candidate path based on the at least one hazard track; and
display the first candidate path and the first path performance metric.

16. The system of claim 15 wherein the analysis system is configured to generate the first path performance metric associated with the first candidate path based on the at least one hazard track and the first candidate path.

17. The system of claim 16 wherein the analysis system is configured to generate the first path performance metric based on execution of a Monte Carlo simulation dependent on the at least one hazard track and the first candidate path.

18. The system of claim 15 wherein the analysis system is configured to generate the first candidate path based on the generated area of restriction data, the platform movement capability data, and the at least one hazard track.

19. The system of claim 18 wherein the analysis system is configured to generate the first candidate path based on the generated area of restriction data, the platform movement capability data, the at least one hazard track, and at least one previously generated candidate path.

20. The system of claim 15 wherein the analysis system is configured to:
generate the first path performance metric associated with the first candidate path based on the at least one hazard track wherein the first path performance metric comprises a first probability of success associated with the first candidate path; and
display the first candidate path and the first path performance metric comprising the first probability of success associated with the first candidate path.

21. The system of claim 15 wherein the analysis system is configured to:
generate a second candidate path based on the generated area of restriction data and platform movement capability data;
generate a second path performance metric associated with the second candidate path based on the at least one hazard track; and
display the second candidate path and the second path performance metric.

22. The system of claim 15 wherein the analysis system is configured to:

generate a second hazard track corresponding to a second hazard navigational route based on the radar sensor system data; and generate the first path performance metric associated with the first candidate path based on the at least one hazard track and the second hazard track.

23. The system of claim 15 wherein the analysis system is configured to generate the first path performance metric associated with the first candidate path based on the at least one hazard track by executing a Monte Carlo simulation based on the at least one hazard track and the weapons capabilities data.

24. The system of claim 15 wherein the received radar sensor system data comprises at least one hazard location.

25. The system of claim 15 wherein the analysis system is configured to receive secondary effects data and generate the first path performance metric associated with the first candidate path based on the at least one hazard track and the received secondary effects data.

26. The system of claim 15 wherein the analysis system is configured to:

generate the first path performance metric associated with the first candidate path based on the at least one hazard track wherein the first path performance metric comprises a first expected number of enemies destroyed and an expected engagement time with the at least one hazard where each is associated with the first candidate path; and display the first candidate path and the first path performance metric comprising the first expected number of enemies destroyed and the expected engagement time with the at least one hazard.

27. A system for presenting multiple transverse path options to a platform's operator to avoid hazards, the system comprising:

a hazard avoidance system configured to:

receive, from one or more automatic sensor data systems, automatic sensor data comprising radar sensor system data and external geographic data; and generate at least one hazard track corresponding to at least one hazard's navigational route based on the radar sensor system data; and an analysis system operatively coupled to the hazard avoidance system and configured to:

generate area of restriction data that identifies at least one area of restriction based on the received external geographic data;

generate a first candidate path based on the generated area of restriction data and platform movement capability data;

generate a first path performance metric associated with the first candidate path based on the at least one hazard track; and display the first candidate path and the first path performance metric.

28. The system of claim 27 wherein the analysis system is configured to generate the first path performance metric associated with the first candidate path based on the at least one hazard track and the first candidate path.

29. The system of claim 28 wherein the analysis system is configured to generate the first path performance metric based on execution of a Monte Carlo simulation dependent on the at least one hazard track and the first candidate path.

30. The system of claim 27 comprising a platform drive system, wherein the platform drive system receives one or more movement commands based on the first candidate path and the first path performance metric to avoid one or more hazards.

31. The system of claim 27 wherein the analysis system is configured to generate the first candidate path based on the generated area of restriction data, the platform movement capability data, and the at least one hazard track.

32. The system of claim 27 wherein the analysis system is configured to:

generate a second candidate path based on the generated area of restriction data and platform movement capability data;

generate a second path performance metric associated with the second candidate path based on the at least one hazard track; and display the second candidate path and the second path performance metric.

33. The system of claim 27 wherein:

the hazard avoidance system is configured to generate a second hazard track corresponding to a second hazard's navigational route based on the radar sensor system data; and the analysis system is configured to generate the first path performance metric associated with the first candidate path based on the at least one hazard track and the second hazard track.

34. A method for presenting multiple transverse path options to a ship's operators to defend itself from an incoming attack by multiple threats comprising:

a method for gathering relevant data from Radar and other situational awareness data sources to identify threat locations;

a method for collecting information about the ship's own weapon systems;

a method for collecting geographic information to identify areas of restriction and integrating that data with the movement capabilities of the ship to create a first candidate path;

a method for generating path performance metrics by performing Monte Carlo simulation on the Surface Warfare Model that is dependent on the Enemy Locations, the Candidate Path, and the Weapon Capabilities of the ship;

a method for presenting a first candidate path with its associated performance metric comprising of Probability of Success, Expected Number of Enemies Destroyed, and Time of Engagement;

a method for presenting the relative current locations of the ship and the threats to the user;

a method for generating additional candidate paths; and a method for presenting all candidate paths with their performance metrics to the user.

35. A method as in claim 34, wherein the ship operator comprises a human or an autonomous control system.

36. A method as in claim 35, wherein threats may be any combination of boats, submarines, land based missile platforms, and aircraft.

* * * * *